(12) United States Patent
Katsuta et al.

(10) Patent No.: US 10,373,577 B2
(45) Date of Patent: Aug. 6, 2019

(54) DISPLAY DEVICE AND ELECTRONIC APPARATUS

(71) Applicant: Japan Display Inc., Tokyo (JP)

(72) Inventors: Tadayoshi Katsuta, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 9 days.

(21) Appl. No.: 15/463,403

(22) Filed: Mar. 20, 2017

(65) Prior Publication Data

US 2017/0193941 A1 Jul. 6, 2017

Related U.S. Application Data

(60) Continuation of application No. 14/985,742, filed on Dec. 31, 2015, now Pat. No. 9,633,616, which is a (Continued)

(30) Foreign Application Priority Data

Feb. 26, 2013 (JP) ................................. 2013-036408

(51) Int. Cl.
*G09G 5/00* (2006.01)
*G09G 3/36* (2006.01)
*G06F 3/044* (2006.01)

(52) U.S. Cl.
CPC ........... *G09G 3/3648* (2013.01); *G06F 3/044* (2013.01); *G09G 3/3614* (2013.01);
(Continued)

(58) Field of Classification Search
CPC ....... G09G 2230/00; G09G 2310/0205; G09G 2310/00; G09G 2310/06; G09G 2310/061; G09G 2310/062; G09G 2310/063
(Continued)

(56) References Cited

U.S. PATENT DOCUMENTS 5,742,269 A * 4/1998 Hayashiguchi ...... G09G 3/3611
345/87
7,679,590 B2 3/2010 Wu
(Continued)

FOREIGN PATENT DOCUMENTS

CN 1040806 8/1998
CN 1731502 8/2005

OTHER PUBLICATIONS

Chinese Office Action dated Dec. 5, 2018 in corresponding Chinese Application No. 201610920707.3.
(Continued)

*Primary Examiner* — Ram A Mistry
(74) *Attorney, Agent, or Firm* — K&L Gates LLP

(57) ABSTRACT

According to an aspect, a display device includes: a plurality of pixels aligned in row and column directions, each of the pixels including a drive element; a plurality of scan lines each coupled with the drive elements included in the pixels aligned in the row direction to transmit thereto a scan signal for selecting the pixels row by row; a plurality of signal lines each coupled with the drive elements included in the pixels aligned in the column direction to write display data; and a display control unit. The display control unit alternately repeats a display period and a stop period. In a latter term of the stop period, display control unit provides the display data written in the respective pixels in a row that has been selected during the display period immediately before the stop period, to the signal lines corresponding to the respective pixels.

4 Claims, 26 Drawing Sheets

Related U.S. Application Data division of application No. 14/179,903, filed on Feb. 13, 2014, now Pat. No. 9,368,078.

(52) U.S. Cl.
CPC ......... *G09G 3/3677* (2013.01); *G09G 3/3688* (2013.01); *G09G 2230/00* (2013.01); *G09G 2300/0408* (2013.01); *G09G 2300/0426* (2013.01); *G09G 2300/0452* (2013.01); *G09G 2310/08* (2013.01)

(58) Field of Classification Search
USPC .............................. 345/212, 213, 98–100, 55
See application file for complete search history.

(56) References Cited

U.S. PATENT DOCUMENTS

| | | |
|---|---|---|
| 2005/0207249 A1 | 9/2005 | Morita |
| 2006/0097966 A1 | 5/2006 | Choi |
| 2007/0103425 A1 | 5/2007 | Tanaka |
| 2010/0289786 A1 | 11/2010 | Tanaka et al. |
| 2011/0025671 A1 | 2/2011 | Lee |
| 2014/0240300 A1* | 8/2014 | Katsuta ................ G09G 3/3614 345/204 |

OTHER PUBLICATIONS

Chinese Office Action dated May 28, 2019 in corresponding Chinese Application No. 201610920707.3.

* cited by examiner

DISPLAY DEVICE AND ELECTRONIC APPARATUS

CROSS REFERENCES TO RELATED APPLICATIONS

The present application is a continuation application of U.S. patent application Ser. No. 14/985,742, filed on Dec. 31, 2015, which application is a division application of U.S. patent application Ser. No. 14/179,903, filed on Feb. 13, 2014, issued as U.S. Pat. No. 9,368,078 on Jun. 14, 2016, which application claims priority to Japanese Priority Patent Application JP 2013-036408 filed in the Japan Patent Office on Feb. 26, 2013, the entire content of which is hereby incorporated by reference.

BACKGROUND

1. Technical Field

The present disclosure relates to a display device and an electronic apparatus, and particularly to a display device and an electronic apparatus that have a stop period of stopping display between display periods.

2. Description of the Related Art

Recent years have seen increasing demands for display devices for use in mobile devices, such as mobile phones and electronic paper devices. Some of such display devices (such as one disclosed in Japanese Patent Application Laid-open Publication No. 7-134278) include a display area arranged with pixels in a matrix and switching elements provided for each pixel, and are driven by an active matrix method.

Some of the display devices driven by the active matrix method alternately repeat a display period of performing a display operation to display an image and a stop period of stopping the display operation. Such display devices may generate streak defects or unevenness in the image caused by the display operation in the display period immediately after the stop period.

For the foregoing reasons, there is a need for a display device and an electronic apparatus that can suppress generation of streak defects or unevenness.

SUMMARY

According to an aspect, a display device that displays an image includes: a display area in which a plurality of pixels are aligned in row and column directions, each of the pixels including a drive element; a plurality of scan lines extending in the row direction, each of the scan lines being coupled to the drive elements included in the pixels aligned in the row direction to transmit thereto a scan signal for selecting the pixels in the display area row by row a plurality of signal lines extending in the column direction, each of the signal lines being coupled to the drive elements included in the pixels aligned in the column direction to write display data of the image to be displayed on the display area to the pixels in a row selected by the scan signal; and a display control unit. The display control unit alternately repeats a display period of writing the display data to the pixels and a stop period of stopping the writing of the display data to the pixels. In a former term of the stop period, the display control unit sets all of the signal lines to have a predetermined potential. In a latter term of the stop period, display control unit provides the display data written in the respective pixels in a row that has been selected during the display period immediately before the stop period, to the signal lines corresponding to the respective pixels.

According to another aspect, a display device that displays an image includes: a display area in which a plurality of pixels are aligned in row and column directions, each of the pixels including a drive element; a plurality of scan lines extending in the row direction, each of the scan lines being coupled to the drive elements included in the pixels aligned in the row direction to transmit thereto a scan signal for selecting the pixels in the display area row by row; a plurality of signal lines extending in the column direction, each of the signal lines being coupled to the drive elements included in the pixels aligned in the column direction to write display data of the image to be displayed on the display area to the pixels in a row selected by the scan signal; switches provided between a transmission source of the display data and the signal lines; and a display control unit. The display control unit alternately repeats a display period of writing the display data to the pixels and a stop period of stopping the writing of the display data to the pixels. In the stop period, the display control unit turns off all of the switches and sets wiring from the transmission source to the switches to have any desirable potential.

According to another aspect, an electronic apparatus includes any one of the display devices.

Additional features and advantages are described herein, and will be apparent from the following Detailed Description and the figures.

DETAILED DESCRIPTION

Embodiments for practicing the present disclosure will be described in detail in the following order, with reference to the accompanying drawings.
1. Embodiment
  1-1. Display device
  1-2. Display device with touch detection function
2. Application examples (electronic apparatuses)
3. Aspects of present disclosure 1. Embodiment A liquid crystal display device to which the present disclosure is applied may be a display device for monochrome display or a display device for color display. In a display device for color display, one pixel (unit pixel) serving as a unit of forming a color image includes a plurality of sub-pixels. More specifically, the unit pixel in the display device for color display includes, for example, a total of three sub-pixels of a sub-pixel displaying red (R), a sub-pixel displaying green (G), and a sub-pixel displaying blue (B).

However, one pixel is not limited to the combination of the sub-pixels of the three primary colors of R, G, and B. The unit pixel can be formed, for example, by adding a sub-pixel of one color or sub-pixels of a plurality of colors to the sub-pixels of the three primary colors of R, G, and B. More specifically, the unit pixel can be formed, for example, by adding a sub-pixel displaying white (W) to increase luminance, or by adding at least one sub-pixel displaying a complementary color to expand a color reproduction range.

1-1. Display Device

Figure 1:
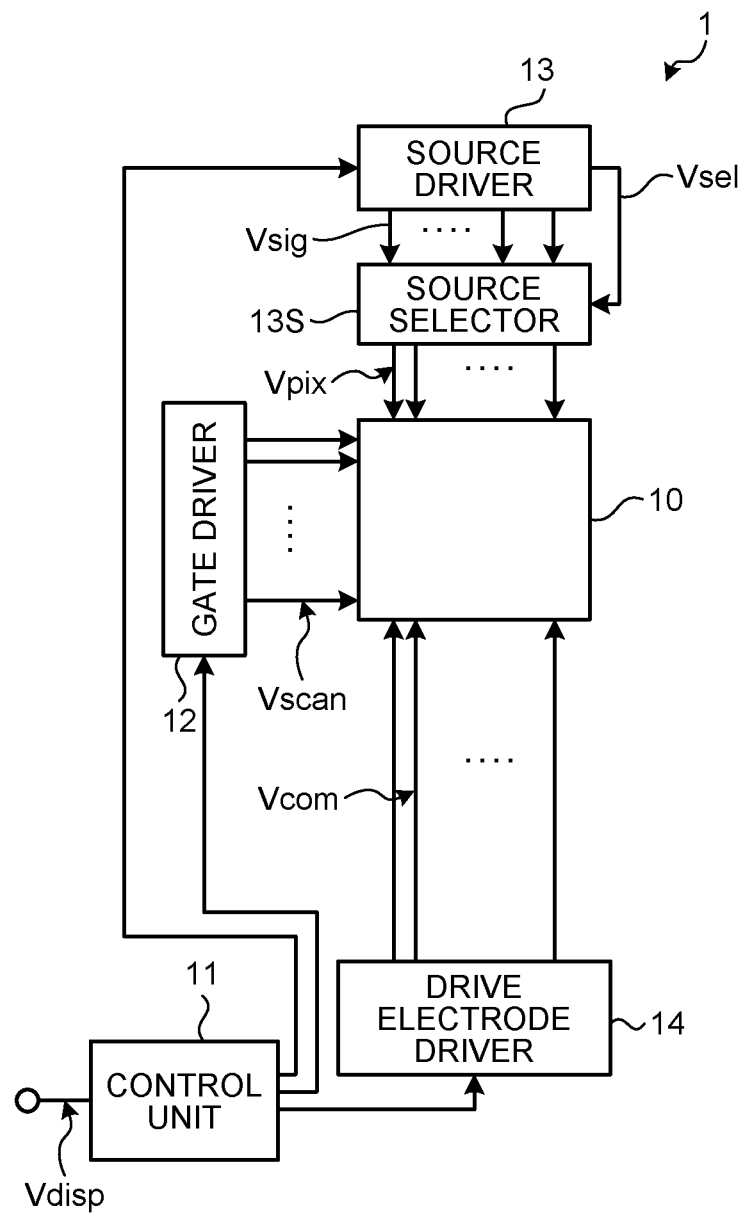
FIG. 1 is a block diagram illustrating an example of a display device according to an embodiment.

FIG. 1 is a block diagram illustrating an example of the display device according to the present embodiment. The display device 1 includes a liquid crystal display unit 10 including liquid crystal display elements as display elements, a control unit 11, a gate driver 12, a source driver 13, a source selector 13S, and a drive electrode driver 14. As will be described later, the liquid crystal display unit 10 is a device that performs display by sequentially scanning one horizontal line at a time according to a scan signal Vscan fed from the gate driver 12. The control unit 11 serving as a display control unit of the display device 1 is a circuit that feeds, based on an externally supplied video signal Vdisp, control signals to the gate driver 12, the source driver 13, and the drive electrode driver 14, and thus controls these drivers so as to operate them in synchronization with each other. A control device in the present disclosure includes the control unit 11, the gate driver 12, the source driver 13, and the drive electrode driver 14.

The gate driver 12 has a function to sequentially select, based on the control signal transmitted from the control unit 11, one horizontal line to be driven for display by the liquid crystal display unit 10. The source driver 13 is a circuit that feeds, based on the control signal transmitted from the control unit 11, pixel signals Vpix to respective pixels Pix (sub-pixels SPix) (to be described later) of the liquid crystal display unit 10. In the present embodiment, each of the pixels Pix is the above-described unit pixel because the display device 1 provides color display.

As will be described later, the source driver 13 generates, from the video signal Vdisp for one horizontal line, an image signal Vsig obtained by multiplexing the pixel signals Vpix of the sub-pixels SPix of the liquid crystal display unit 10, and transmits the image signal Vsig to the source selector 13S. The source driver 13 also generates selector switch control signals Vsel necessary for separating the pixel signals Vpix multiplexed into the image signal Vsig from the image signal Vsig, and transmits the selector switch control signals Vsel together with the image signal Vsig to the source selector 13S. This multiplexing can reduce the number of wiring lines between the source driver 13 and the source selector 13S. In the present embodiment, the video signal Vdisp and the image signal Vsig correspond to display data.

The drive electrode driver 14 is a circuit that feeds, based on the control signal transmitted from the control unit 11, a display driving voltage VCOM to common electrodes COML (to be described later) of the liquid crystal display unit 10.

Figure 2:
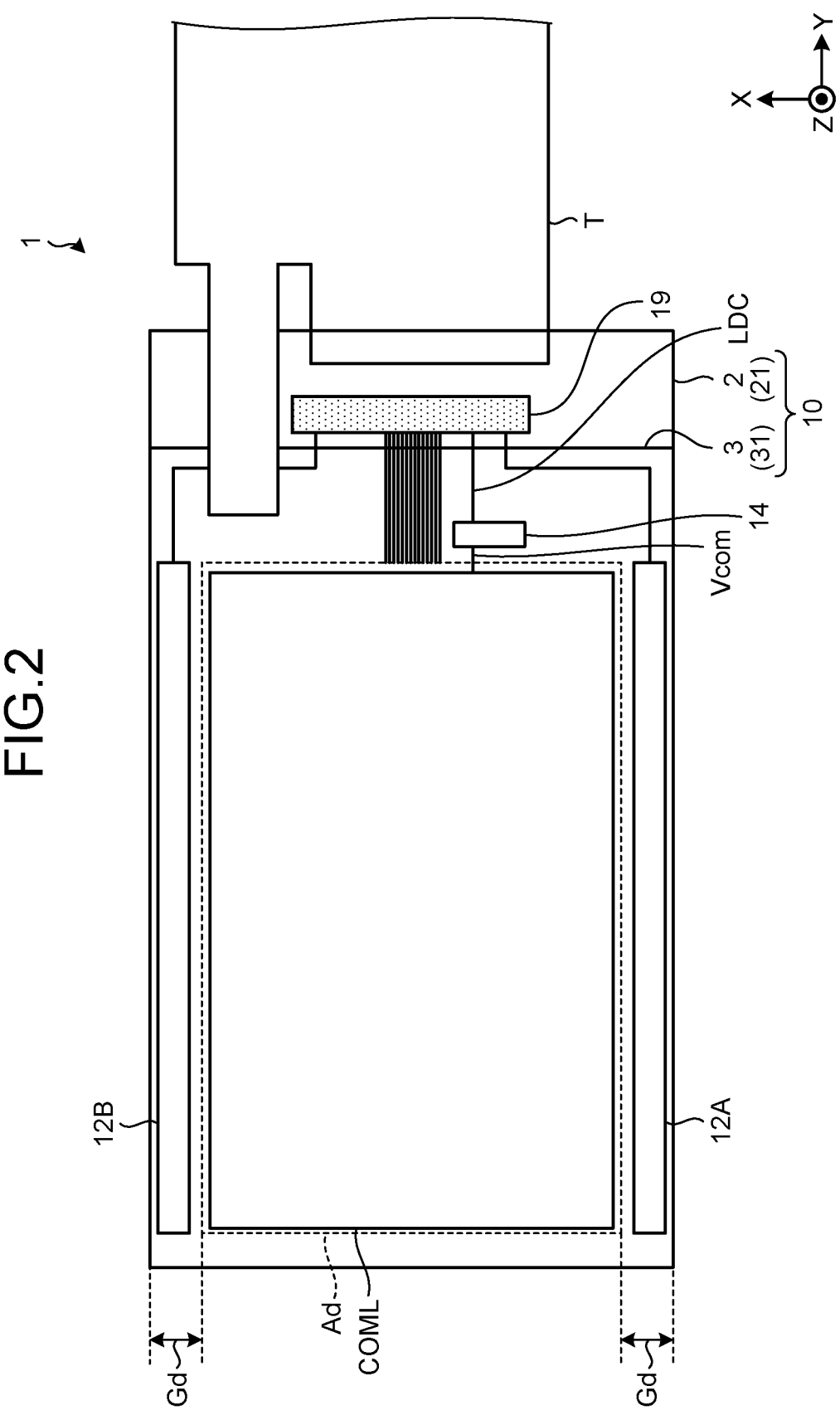
FIG. 2 is a plan view illustrating the example of the display device according to the embodiment.

FIG. 2 is a plan view illustrating the example of the display device according to the present embodiment. The liquid crystal display unit 10 of the display device 1 includes a pixel substrate 2 (TFT substrate 21) and a counter substrate 3 (glass substrate 31) facing the pixel substrate 2. A flexible printed circuit board T is mounted on the liquid crystal display unit 10. The pixel substrate 2 is equipped with a chip on glass (COG) 19. The pixel substrate 2 is provided with a display area Ad and frames Gd of the liquid crystal display unit 10. The COG 19 is a chip of an integrated circuit (IC) driver mounted on the TFT substrate 21, and is a control device having built-in circuits, such as the control unit 11, necessary for display operations of the display device 1. While the present embodiment forms the source driver 13 and the source selector 13S described above on the TFT substrate 21, the present disclosure is not limited to such a structure. The source driver 13 and the source selector 13S may be built into the COG 19. The gate driver 12 is formed as gate drivers 12A and 12B on the TFT substrate 21. The display device 1 may have circuits including the gate driver 12 built into the COG 19. As illustrated in FIG. 2, the common electrodes COML are provided in the display area Ad.

The source selector 13S is formed using thin-film transistor (TFT) elements near the display area Ad on a surface of the TFT substrate 21. A plurality of pixels are arranged in a matrix in the display area Ad. In the present embodiment, the row direction is the X-direction, and the column direction is the Y-direction indicated in FIG. 2. The direction orthogonal to the X-direction and the Y-direction is the Z-direction. The Z-direction is orthogonal to the surface of the TFT substrate 21. The frames Gd and Gd are areas in which no pixels are arranged when the surface of the TFT substrate 21 is viewed from a direction orthogonal thereto.

The gate driver 12 is disposed at each of the frames Gd. The gate driver 12 includes the gate drivers 12A and 12B, and is formed using the TFT elements on the surface of the TFT substrate 21. The gate drivers 12A and 12B can alternately drive the sub-pixels (pixels) from one side in a direction (scan direction) in which the gate drivers 12A and 12B are arranged with the display area Ad therebetween, in which the sub-pixels (pixels) are arranged in a matrix (to be described later). Alternatively, one scan line coupled to a plurality of sub-pixels (pixels) may be capable of being driven by both the gate drivers 12A and 12B. The following description may refer to the gate driver 12A as a "first gate driver 12A" and the gate driver 12B as a "second gate driver 12B". The scan lines (to be described later) are arranged between the first gate driver 12A and the second gate driver 12B. The drive electrode driver 14 applies the display driving voltage VCOM to the common electrodes COML via display wiring LDC.

Liquid Crystal Display Unit

Figure 3:
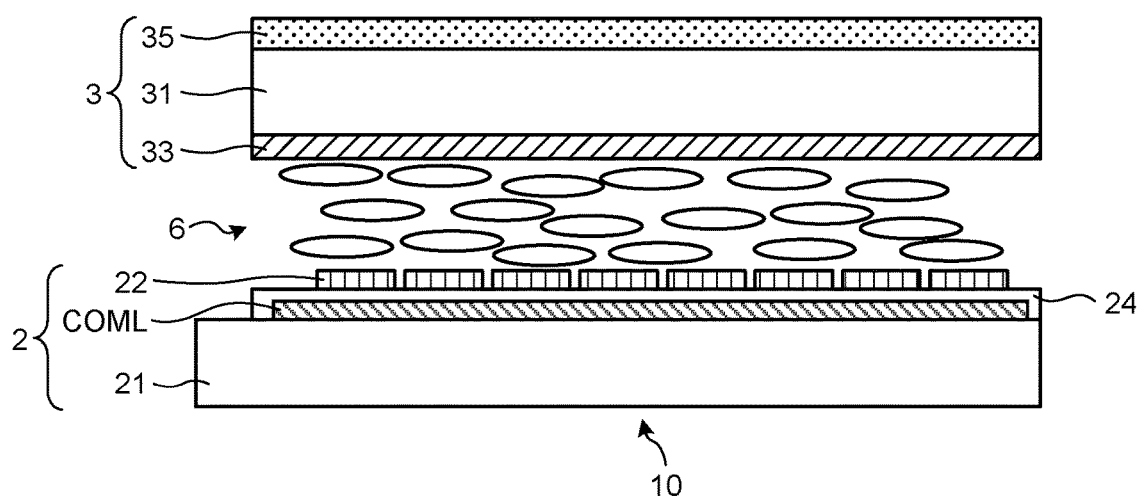
FIG. 3 is a sectional view illustrating an example of a liquid crystal display unit according to the embodiment.
Figure 4:
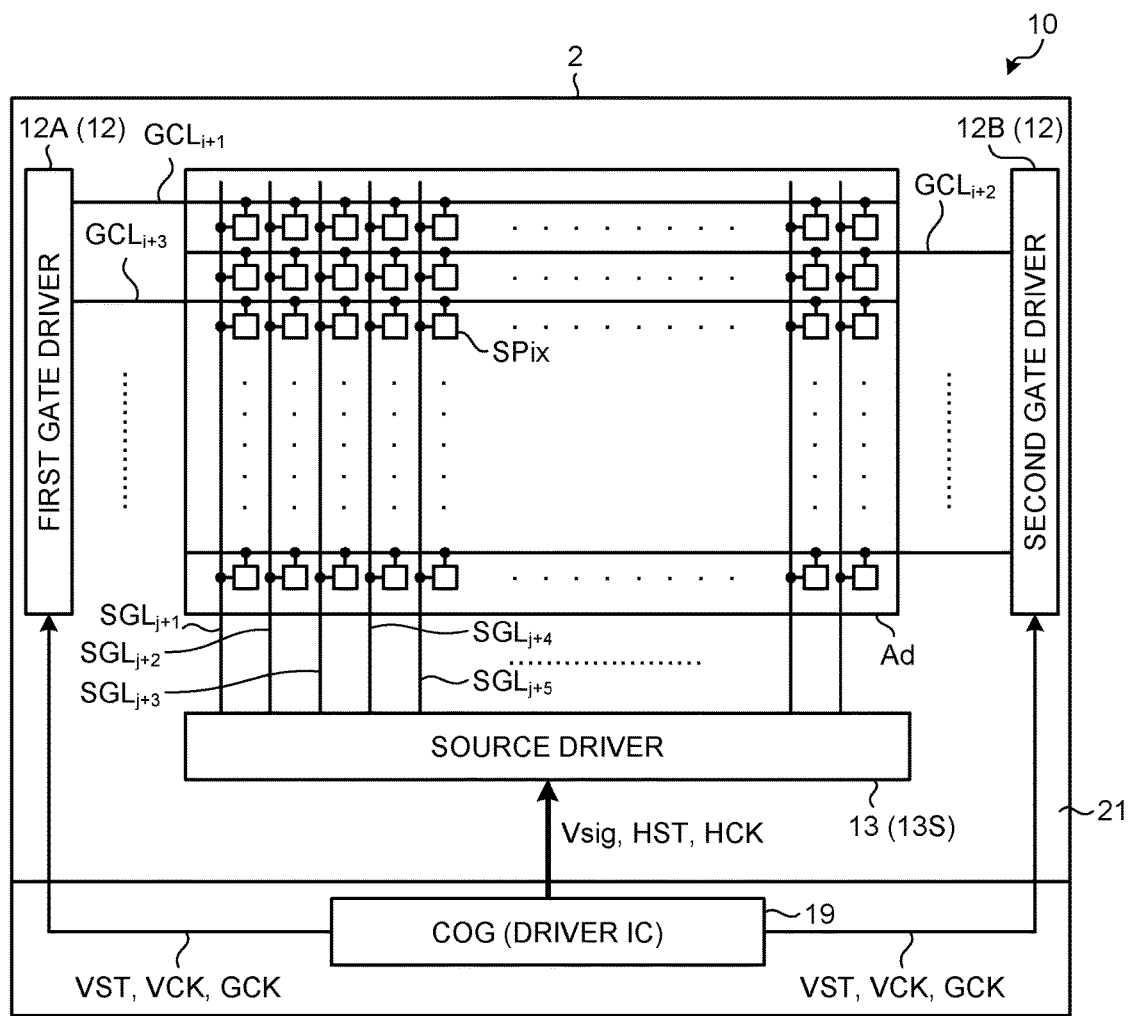
FIG. 4 is a block diagram illustrating the example of the liquid crystal display unit according to the embodiment.
Figure 5:
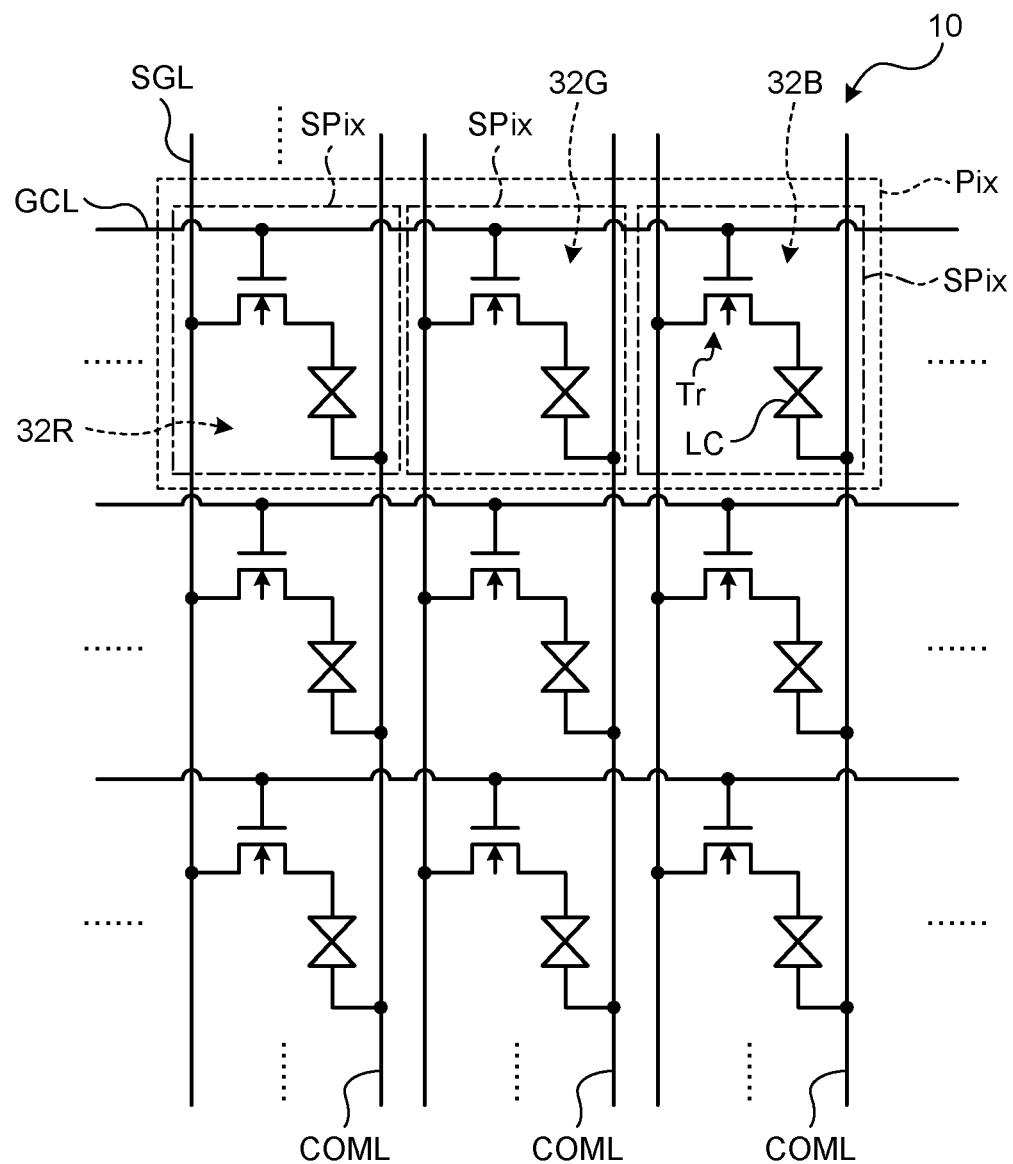
FIG. 5 is a diagram illustrating a pixel array of the liquid crystal display unit according to the embodiment.

FIG. 3 is a sectional view illustrating an example of the liquid crystal display unit according to the present embodiment. FIG. 4 is a block diagram illustrating the example of the liquid crystal display unit according to the present embodiment. FIG. 5 is a diagram illustrating a pixel array of the liquid crystal display unit according to the present embodiment. As illustrated in FIG. 3, the liquid crystal display unit 10 includes the pixel substrate 2, the counter substrate 3 disposed facing a surface of the pixel substrate 2 in a direction orthogonal thereto, and a liquid crystal layer 6 provided between the pixel substrate 2 and the counter substrate 3.

The liquid crystal layer 6 modulates light passing therethrough according to the state of an electric field. In the present embodiment, the liquid crystal layer 6 contains liquid crystals of a horizontal electric field mode, such as a fringe field switching (FFS) mode or an in-plane switching (IPS) mode, but, not limited to this, may contain liquid crystals of a vertical electric field mode. Orientation film may be provided between the liquid crystal layer 6 and the pixel substrate 2, and between the liquid crystal layer 6 and the counter substrate 3, which are illustrated in FIG. 3, respectively.

The counter substrate 3 includes the glass substrate 31 and a color filter 33 formed on one surface of the glass substrate 31. A polarizing plate 35 is provided on the other surface of the glass substrate 31. The pixel substrate 2 includes the TFT substrate 21 as a circuit substrate, a plurality of pixel electrodes 22 arranged in a matrix on the surface of the TFT substrate 21, the common electrodes COML formed between the TFT substrate 21 and the pixel electrodes 22, and an insulation layer 24 insulating the pixel electrodes 22 from the common electrodes COML.

As illustrated in FIG. 4, the pixel substrate 2 includes, on the surface of the TFT substrate 21, the display area Ad, the COG 19 having functions of an interface (I/F) and a timing generator, the first and the second gate drivers 12A and 12B, and the source driver 13. The flexible printed circuit board T illustrated in FIG. 2 transmits external signals and drive power for driving the COG 19 to the COG 19 illustrated in FIG. 4, which is disposed as the COG 19 illustrated in FIG. 2. The pixel substrate 2 includes the display area Ad, which lies on the surface of the TFT substrate 21 that is a transparent insulating substrate (such as a glass substrate), and in which the pixels including liquid crystal cells are arranged in a matrix. The pixel substrate 2 also includes the source driver (a horizontal drive circuit) 13, the first gate driver 12A as a vertical drive circuit, and the second gate driver 12B as a vertical drive circuit. The first and the second gate drivers 12A and 12B are arranged with the display area Ad interposed therebetween.

The display area Ad has a matrix structure in which the sub-pixels SPix each including a liquid crystal layer are arranged in M rows by N columns (M and N are natural numbers). The present application uses the term "row" to refer to a pixel row including N sub-pixels SPix arranged in one direction. Further, the present application uses the term "column" to refer to a pixel column including M sub-pixels SPix arranged in a direction orthogonal to the direction of alignment of the row. The values of M and N are determined according to display resolutions in the vertical and horizontal directions.

In the display area Ad, scan lines $GCL_{i+1}$, $GCL_{i+2}$, $GCL_{i+3}$, . . . are wired for each row, and signal lines $SGL_{j+1}$, $SGL_{j+2}$, $SGL_{j+3}$, $SGL_{j+4}$, $SGL_{j+5}$, . . . are wired for each column, with respect to the array of M rows and N columns of the sub-pixels SPix. Hereinafter, in the embodiment, the scan lines $GCL_{i+1}$, $GCL_{i+2}$, $GCL_{i+3}$, . . . may be represented as scan lines GCL or scan lines $GCL_i$, and the signal lines $SGL_{j+1}$, $SGL_{j+2}$, $SGL_{j+3}$, $SGL_{j+4}$, $SGL_{j+5}$, . . . may be represented as signal lines SGL or signal lines $SGL_j$. The scan lines GCL extend in the row direction, and the signal lines SGL extend in the column direction.

The pixel substrate 2 is externally supplied with external signals, that is, a master clock, a horizontal synchronizing signal, and a vertical synchronizing signal, which are in turn supplied to the COG 19. The COG 19 converts the levels (increases the voltages) of the master clock, the horizontal synchronizing signal, and the vertical synchronizing signal having the voltage amplitude of an external power supply to the voltage amplitude of an internal power supply required to drive the liquid crystals, and passes the master clock, the horizontal synchronizing signal, and the vertical synchronizing signal of the increased amplitude through the timing generator to generate a vertical start pulse VST, a vertical clock pulse VCK, a switch control signal GCK, a horizontal start pulse HST, and a horizontal clock pulse HCK. The COG 19 provides the vertical start pulse VST, the vertical clock pulse VCK, and the switch control signal GCK to the first and the second gate drivers 12A and 12B, and provides the horizontal start pulse HST and the horizontal clock pulse HCK to the source driver 13. The COG 19 generates the display driving voltage VCOM and provides it to the above-described common electrodes COML. The display driving voltage VCOM is also called a common potential because of being commonly provided to the respective sub-pixels SPix with respect to the pixel electrodes.

Each of the first and the second gate drivers 12A and 12B includes a transfer circuit and a buffer circuit. The transfer circuit includes a shift register and may further include a latch circuit and so on. Each of the first and the second gate drivers 12A and 12B generates vertical scan pulses as scan signals from the vertical start pulses VST and the vertical clock pulses VCK described above, and provides the generated pulses to the scan lines GCL so as to sequentially select the sub-pixels SPix row by row. The first and the second gate drivers 12A and 12B are arranged with the scan lines GCL interposed therebetween in the extending direction of the scan lines GCL. The first and the second gate drivers 12A and 12B output the vertical scan pulses sequentially from a relatively upper side of the display area Ad toward a relatively lower side of the display area Ad. The relatively upper side means the side opposite to the COG 19, and the relatively lower side means the side of the COG 19.

The first and the second gate drivers 12A and 12B alternately apply the vertical scan pulses to the scan lines GCL in the direction (scan direction, or Y-direction) of alignment of the scan lines GCL, and thus select the sub-pixels SPix of the display area Ad row by row. The first and the second gate drivers 12A and 12B are arranged at the respective longitudinal ends of the scan lines GCL, and alternately apply the vertical scan pulses to the scan lines GCL in every other row, thus selecting the pixels of the display area Ad row by row. Each of the scan lines GCL is coupled to either one of the first and the second gate drivers 12A and 12B at its end in the direction. This can reduce the number of transistor elements as compared with a case of coupling the gate drivers to longitudinal ends of each scan line GCL, respectively. As a result, the area of the above-described frames Gd can be reduced in the display device 1.

The source driver 13 is supplied with, for example, a 6-bit display data of red (R), green (G), and blue (B). The source driver 13 writes the display data via the source selector 13S and the signal lines SGL to the sub-pixels SPix of the row selected through the vertical scan (scan in the Y-direction) by the first or the second gate driver 12A or 12B, pixel by pixel, or a plurality of pixels at a time, or all pixels at a time.

The TFT substrate 21 is provided with the wiring, such as the signal lines SGL that feed the pixel signals Vpix to the thin-film transistors Tr (hereinafter called TFT elements Tr as appropriate) of the sub-pixels SPix illustrated in FIGS. 4 and 5 and to the pixel electrodes 22 illustrated in FIG. 3, and the scan lines GCL that drive the TFT elements Tr. In this manner, the signal lines SGL extend in a plane parallel to the surface of the TFT substrate 21, and feed the pixel signals Vpix for displaying an image to the pixels. The liquid crystal display unit 10 illustrated in FIG. 5 includes the sub-pixels SPix arranged in a matrix. Each of the sub-pixels SPix includes the TFT element Tr and a liquid crystal element LC. The TFT element Tr is an n-channel metal oxide semiconductor (MOS) TFT in the present example. One of the source and the drain of the TFT element Tr is coupled to one of the signal lines SGL; the gate thereof is coupled to one of the scan lines GCL; and the other of the source and the drain is coupled to one end of the liquid crystal element LC. The liquid crystal element LC is coupled, for example, at one end thereof, to the drain of the TFT element Tr, and at the other end thereof, to one of the common electrodes COML.

Each of the first and the second gate drivers 12A and 12B illustrated in FIG. 4 applies the vertical scan pulse to the gates of the TFT elements Tr of the sub-pixels SPix via the scan lines GCL illustrated in FIG. 5 so as to sequentially select one row (one horizontal line) of the sub-pixels SPix formed in a matrix in the display area Ad as a row to be driven for display. The source driver 13 feeds the pixel signals Vpix via the signal lines SGL to the respective sub-pixels SPix included in one horizontal line sequentially selected by the first and the second gate drivers 12A and 12B. These sub-pixels SPix perform display of one horizontal line according to the supplied pixel signals Vpix. The drive electrode driver 14 applies the drive signal for display (display driving voltage VCOM) to the common electrodes COML.

As described above, in the display device 1, the first and the second gate drivers 12A and 12B drive the scan lines $GCL_{i+1}$, $GCL_{i+2}$, $GCL_{i+3}$, . . . to perform sequential scan, and thereby sequentially select one horizontal line. The source driver 13 feeds the pixel signals Vpix to the sub-pixels SPix belonging to one horizontal line, so that the display device 1 performs display one horizontal line at a time. When this display operation is performed, the drive electrode driver 14 applies the display driving voltage VCOM to the common electrodes COML.

Color regions of the color filter 33 illustrated in FIG. 3 that are colored, for example, in the three colors of red (R), green (G), and blue (B) are periodically arranged, and one set of these color regions 32R, 32G, and 32B (refer to FIG. 5) of the three colors of R, G, and B is associated, as a pixel Pix, with the sub-pixels SPix illustrated in FIG. 5 mentioned above. The color filter 33 faces the liquid crystal layer 6 in the direction orthogonal to the TFT substrate 21. This allows each of the sub-pixels SPix to display a single color. The color filter 33 may have a combination of other colors if colored in different colors. The color filter 33 is not necessarily provided. Thus, a region free from the color filter 33, that is, a region of transparent sub-pixels SPix may exist.

The sub-pixels SPix illustrated in FIG. 5 are coupled to the other sub-pixels SPix belonging to the same row of the liquid crystal display unit 10 via the corresponding scan line GCL. The scan lines GCL are coupled to the gate driver 12, and supplied with the scan signals Vscan from the gate driver 12. The sub-pixels SPix are coupled to the other sub-pixels SPix belonging to the same column of the liquid crystal display unit 10 via the corresponding signal line SGL. The signal lines SGL are coupled to the source driver 13, and supplied with the pixel signals Vpix from the source driver 13.

Figure 6:
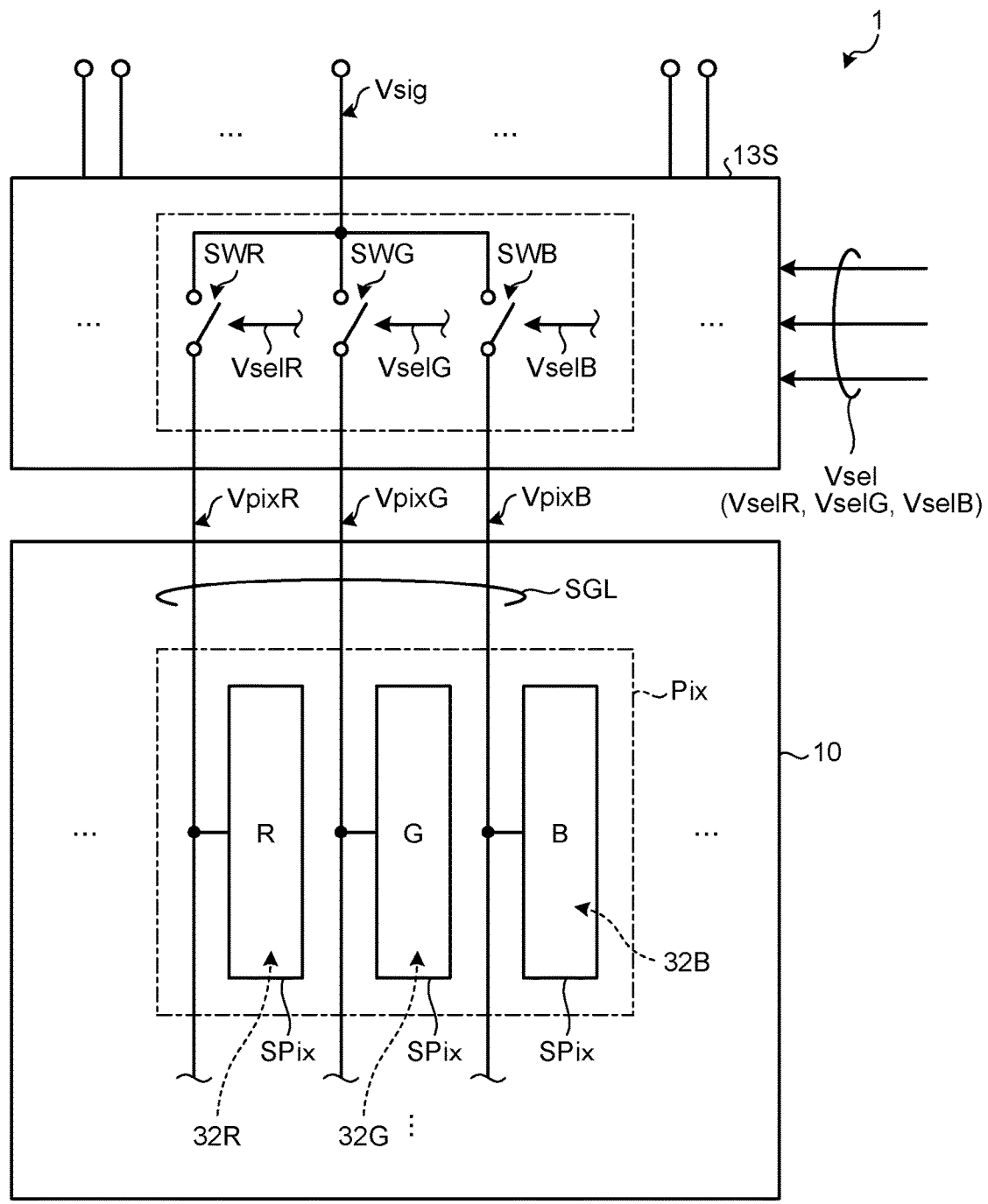
FIG. 6 is a schematic diagram for explaining a relation between a source driver and signal lines in the display device according to the embodiment.

FIG. 6 is a schematic diagram for explaining a relation between the source driver and the signal lines in the display device according to the present embodiment. As illustrated in FIG. 6, the signal lines SGL of the display device 1 are coupled to the source driver 13 via the source selector 13S. The source selector 13S performs on/off operations according to the selector switch control signals Vsel.

As illustrated in FIG. 6, based on the display data and the source driver control signal fed from the control unit 11, the source driver 13 generates and outputs the image signal. From the display data for one horizontal line, the source driver 13 generates the image signals Vsig into each of which the pixel signals Vpix (VpixR, VpixG, and VpixB) to be provided to a plurality of sub-pixels SPix (three sub-pixels SPix in the present example) are multiplexed, and provides the image signals Vsig to the source selector 13S. The source driver 13 also generates the selector switch control signals Vsel (VselR, VselG, and VselB) necessary for separating the pixel signals VpixR, VpixG, and VpixB from each image signal Vsig into which the pixel signals VpixR, VpixG, and VpixB have been multiplexed, and provides the generated signals Vsel together with the image signals Vsig to the source selector 13S. This multiplexing reduces the number of wiring lines between the source driver 13 and the source selector 13S as described above.

Based on the image signals Vsig as display data and the selector switch control signals Vsel provided by the source driver 13, the source selector 13S separates the pixel signals Vpix from each image signal Vsig into which the pixel signals Vpix have been time-divisionally multiplexed, and provides the pixel signals Vpix to the liquid crystal display unit 10 of the display device 1. The source selector 13S includes, for example, three switches SWR, SWG, and SWB. One end of each of the three switches SWR, SWG, and SWB is coupled with each other, and supplied with the image signal Vsig from the source driver 13. The other end of each of the three switches SWR, SWG, and SWB is coupled to the sub-pixels SPix via the corresponding signal line SGL of the liquid crystal display unit 10.

The control unit 11 provides the signal for display to the source driver 13. Based on the signal, the source driver 13 generates the selector switch control signals Vsel (VselR, VselG, and VselB). The selector switch control signals Vsel (VselR, VselG, and VselB) provided by the source driver 13 open or close the three switches SWR, SWG, and SWB, respectively. Such a structure allows the source selector 13S to sequentially turn on the switches SWR, SWG, and SWB on a time-division basis according to the selector switch control signals Vsel. The source selector 13S performs such an operation to separate the pixel signals Vpix (VpixR, VpixG, and VpixB) as display data from the multiplexed image signal Vsig as display data. The source selector 13S feeds the pixel signals Vpix to the respective three sub-pixels SPix.

The above-described color regions 32R, 32G, and 32B colored in the three colors of red (R), green (G), and blue (B) correspond to the respective sub-pixels SPix. With this configuration, the pixel signal VpixR is provided to the sub-pixel SPix corresponding to the color region 32R, the pixel signal VpixG is provided to the sub-pixel SPix corresponding to the color region 32G, and the pixel signal VpixB is provided to the sub-pixel SPix corresponding to the color region 32B.

The sub-pixels SPix are coupled with the other sub-pixels SPix belonging to the same column of the liquid crystal display unit 10 via the corresponding common electrode COML. The common electrodes COML are coupled with the drive electrode driver 14, and supplied with the display driving voltage VCOM from the drive electrode driver 14. In other words, in the present example, the sub-pixels SPix belonging to the same column share the common electrode COML.

Operation of Display Device

Figure 7:
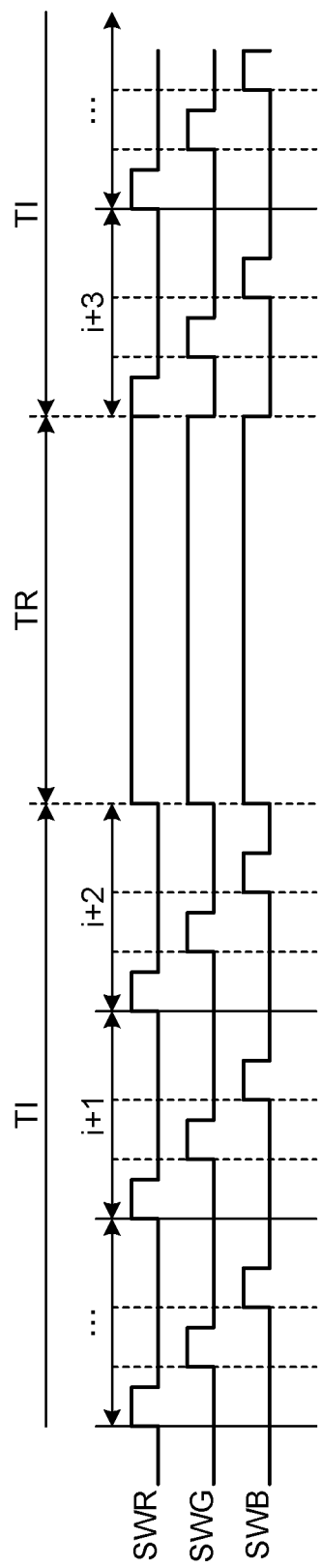
FIG. 7 is a timing chart for explaining an operation of the display device according to the embodiment.

FIG. 7 is a timing chart for explaining an operation of the display device according to the present embodiment. The display device 1 alternately repeats a period (display period) TI in which display drive is performed and a period (stop period) TR in which display drive is stopped, during one frame period of the liquid crystal display unit 10. Specifically, during (i+1) of the display period TI, the switches SWR, SWG, and SWB of the source selector 13S illustrated in FIG. 6 are sequentially turned on and off, and thus, the pixel signals Vpix (VpixR, VpixG, and VpixB) are provided to the respective sub-pixels SPix coupled to the scan line $GCL_{i+1}$ illustrated in FIG. 4. In other words, the display data is written to the sub-pixels SPix coupled to the scan line $GCL_{i+1}$. During (i+2) of the display period TI, the switches SWR, SWG, and SWB operate in the same manner as during (i+1) of the display period TI, and thus, the pixel signals Vpix (VpixR, VpixG, and VpixB) are provided to the respective sub-pixels SPix coupled to the scan line $GCL_{i+2}$ illustrated in FIG. 4, so that the display data is written to the sub-pixels SPix.

The stop period TR is provided after the end of (i+2) of the display period TI before (i+3) of the display period TI. The present example maintains all of the switches SWR, SWG, and SWB of the source selector 13S illustrated in FIG. 6 in the on state during the stop period TR. The stop period TR is a state in which the gate driver 12 illustrated in FIG. 4 does not select any of the scan lines GCL. Thus, the stop period TR is a period in which the drive for display is stopped, or, more specifically, a period in which the operation of writing the display data is stopped for any of the scan lines GCL. For example, a drive different from the drive for displaying an image can be performed during the stop period TR. Examples of such a drive include, but are not limited to, a drive in which the potential of the common electrodes COML changes, including, as an example, a sensing drive of a touch panel. After the stop period TR, the display period TI is started again as (i+3). The display device 1 performs display of one frame of the liquid crystal display unit 10 while alternately repeating the display period TI and the stop period TR. A description will be made of an image displayed on the display area Ad of the display device 1 when the operation of repeating the display period TI and the stop period TR is performed during one frame.

Images Displayed in Display Area

Figure 8:
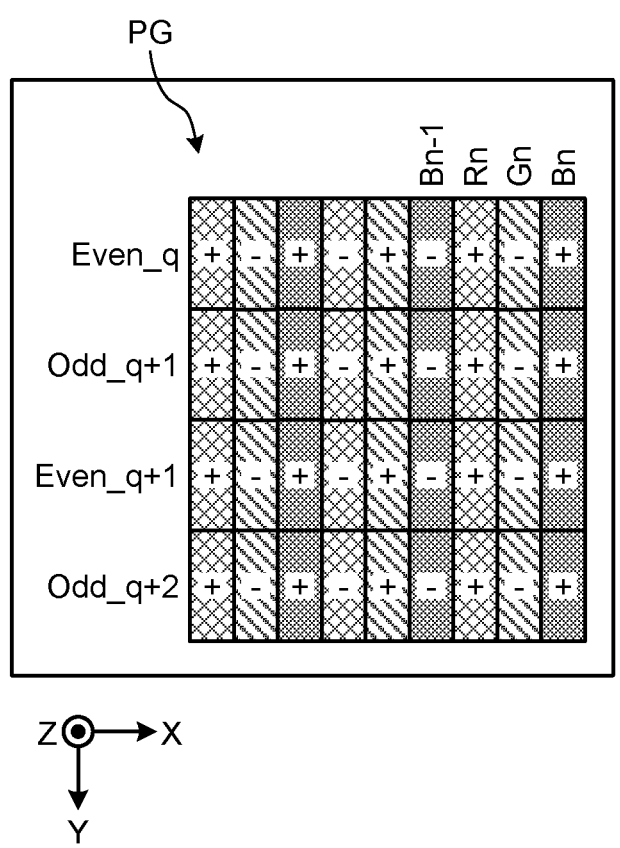
FIG. 8 is a diagram illustrating an example in which a display device according to a related art displays a gray raster image.
Figure 9:
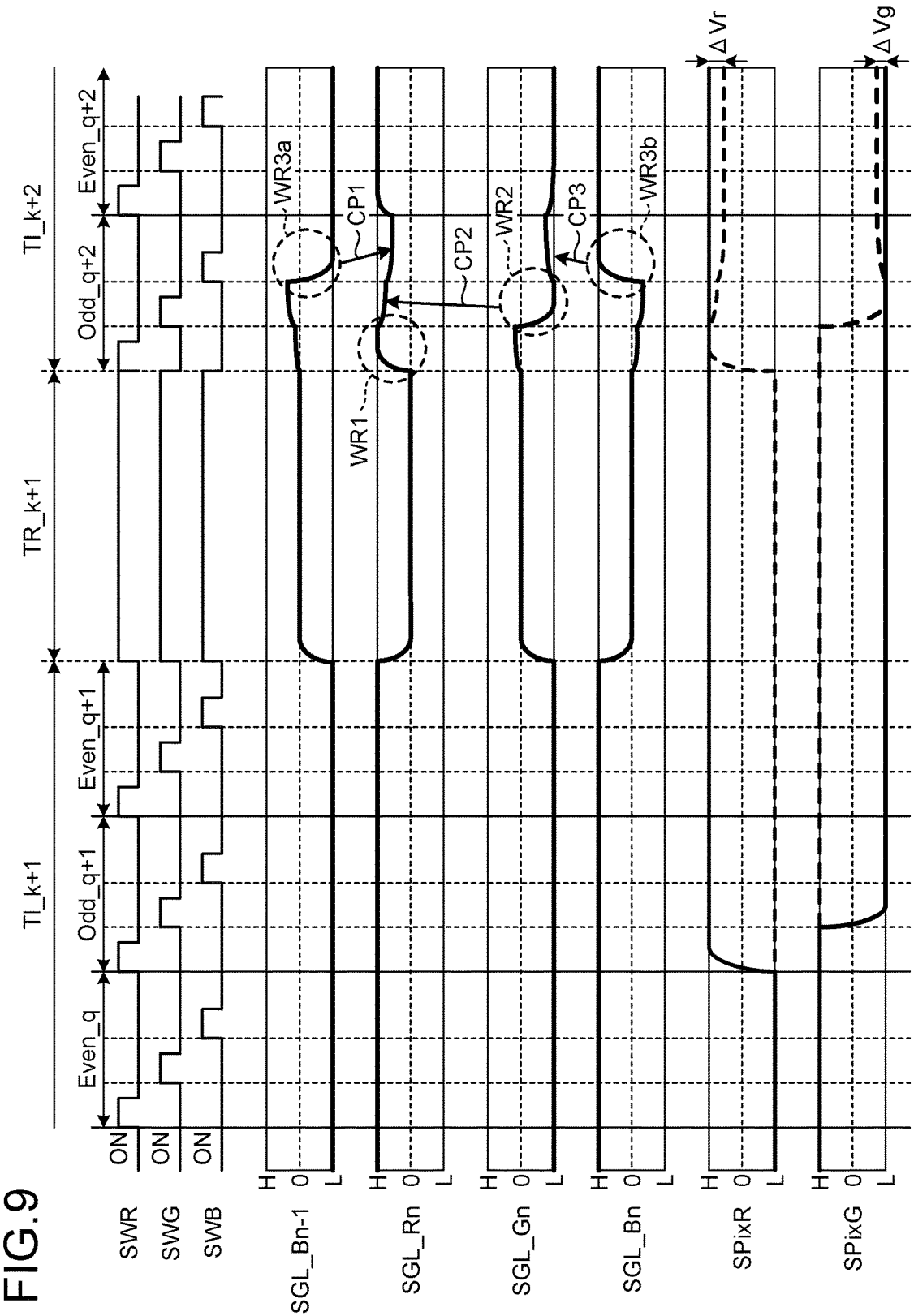
FIG. 9 is a timing chart illustrating the operation of the display device according to the related art when displaying the gray raster image.

FIG. 8 is a diagram illustrating an example in which a display device according to a related art displays a gray raster image. FIG. 9 is a timing chart illustrating the operation of the display device according to the related art when displaying the gray raster image. As illustrated in FIG. 8, the display device according to the related art displays the image using a column inversion method. The gray raster image is an image in which every sub-pixel is displayed at a certain gradation level. In FIGS. 8 and 9, the symbol Even corresponds to even-numbered scan lines GCL, and the symbol Odd corresponds to odd-numbered scan lines GCL. The symbols n and q are natural numbers, and are used for identifying the scan lines GCL and the signal lines SGL. The symbols k+1 and k+2 attached to the display period TI and the stop period TR are used for identifying these periods. The symbol k is a natural number. The symbols R, G, and B attached to the signal lines SGL represent the colors of the sub-pixels SPix coupled to the signal lines SGL. The symbols n−1 and n are used for identifying the signal lines SGL. The symbol n is a natural number.

In the example illustrated in FIGS. 8 and 9, during a display period TI_k+1, a driver similar to the gate driver 12 illustrated in FIG. 4 selects the scan lines GCL in the order of Even_q, Odd_q+1, and Even_q+1. When each of the scan lines GCL corresponding to Even_q, Odd_q+1, and Even_q+1 is selected, the switches SWR, SWG, and SWB of a selector similar to the source selector 13S illustrated in FIG. 6 are sequentially turned on and off, and thus, the pixel signals Vpix (VpixR, VpixG, and VpixB) are provided to the respective sub-pixels SPix coupled to the selected scan line GCL so as to write the display data to the respective sub-pixels SPix.

During a stop period TR_k+1, the switches SWR, SWG, and SWB are maintained at ON (H). This causes the signal lines SGL to be coupled to ground, and thus causes all potentials of the signal lines SGL_Bn−1, SGL_Rn, SGL_Gn, and SGL_Bn to be 0 during the stop period TR_k+1.

During a display period TI_k+2 following the stop period TR_k+1, the switches SWR, SWG, and SWB are sequentially turned on and off, and thus, the pixel signals Vpix (VpixR, VpixG, and VpixB) are provided to the respective sub-pixels SPix coupled to the selected scan line GCL so as to write the display data to the respective sub-pixels SPix. In the present example, the scan line GCL corresponding to Odd_q+2 is selected at the beginning of the display period TI_k+2. Turning on and off of the switch SWR writes the pixel signal VpixR as display data to the signal line SGL_Rn (symbol WR1 in FIG. 9). In the present example, the potential of the signal line SGL_Rn turns from 0 to H. The pixel signal VpixG is written as display data to the signal line SGL_Gn (symbol WR2 in FIG. 9). This turns the potential of the signal line SGL_Rn from 0 to L in the present example. The pixel signal VpixB is written as display data to the signal lines SGL_Bn−1 and SGL_Bn (symbols WR3a and WR3b in FIG. 9). This turns the potential of the signal line SGL_Bn−1 from 0 to L and the potential of the signal line SGL_Bn from 0 to H in the present example.

When the scan line GCL is switched during the display period TI_k+1, the signal lines SGL_Bn−1, SGL_Rn, SGL_Gn, and SGL_Bn maintain display data immediately before the scan line GCL is switched. However, the potentials of the signal lines SGL_Bn−1, SGL_Rn, SGL_Gn, and SGL_Bn are turned to 0 during the stop period TR_k+1. Therefore, in a row corresponding to Odd_q+2 selected at the beginning of the display period TI_k+2 immediately after the stop period TR_k+1, the signal lines SGL_Bn−1, SGL_Rn, SGL_Gn, and SGL_Bn receive new display data from the state during the stop period TR_k+1, that is, from the state in which the potentials are 0. As a result, the potential changes in the signal lines SGL when a scan line GCL is first selected immediately after the transition from the stop period TR_k+1 to the display period TI_k+2 differ from the potential changes in the signal lines SGL during the display period TI_k+1.

In the present example, only in a row corresponding to Odd_q+2, the adjacent signal lines SGL (specifically, the signal lines SGL_Bn−1 and SGL_Rn, the signal lines SGL_Rn and SGL_Gn, and the signal lines SGL_Gn and SGL_Bn) are peculiarly coupled with each other by electrostatic capacitance (CP1, CP2, and CP3 in FIG. 9). This results in differences in potential of the sub-pixels SPix between the sub-pixels SPix of a row corresponding to Odd_q+2 and the sub-pixels SPix of the other rows, each of which are supposed to display the same gradation.

In the example illustrated in FIG. 9, the dotted lines representing the potentials of the sub-pixels SPixR and SPixG indicate the potentials in a row corresponding to Odd_q+2, and the solid lines representing the potentials of the sub-pixels SPixR and SPixG indicate the potentials in the other rows. The above-described phenomenon causes potential differences ΔVr and ΔVg between a row corresponding to Odd_q+2 and the other rows. The potential differences ΔVr and ΔVg can generate, for example, streak defects or unevenness between the sub-pixels SPix of a row corresponding to Odd_q+2 and the sub-pixels SPix of other rows adjacent thereto. The same applies to cases in which the display device 1 displays an image other than the gray raster image.

Figure 10:
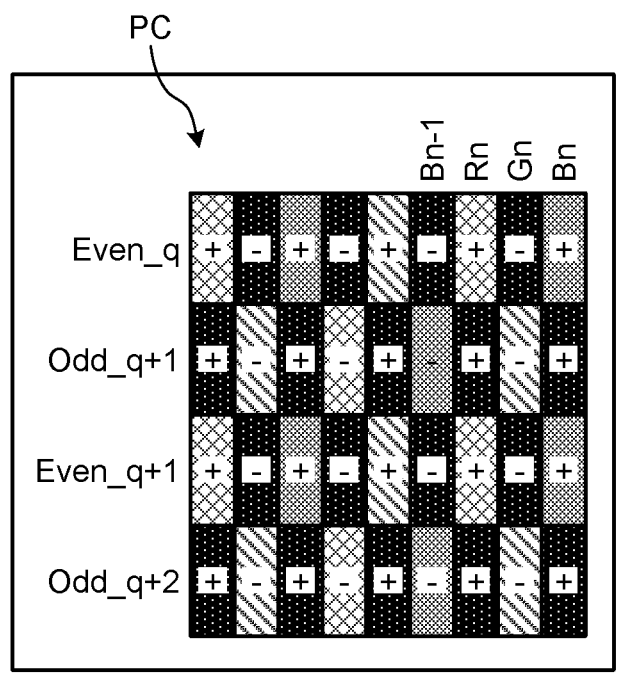
FIG. 10 is a diagram illustrating an example in which the display device according to the related art displays a black-and-gray image.
Figure 11:
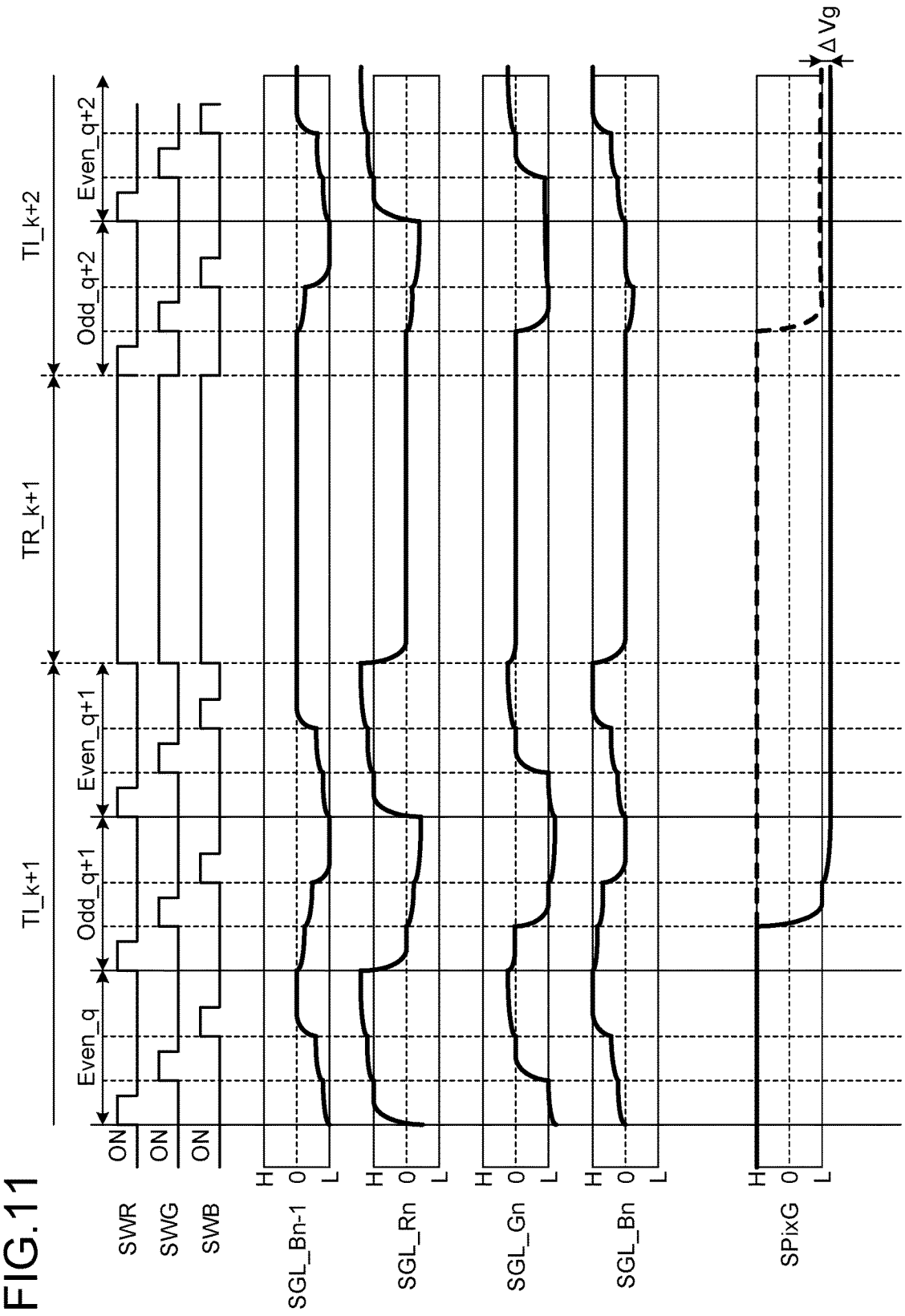
FIG. 11 is a timing chart illustrating the operation of the display device according to the related art when displaying the black-and-gray image.

FIG. 10 is a diagram illustrating an example in which the display device according to the related art displays a black-and-gray image. FIG. 11 is a timing chart illustrating the operation of the display device according to the related art when displaying the black-and-gray image. The black-and-gray image has sub-pixels displayed in black in a zigzag pattern. In the case of the black-and-gray image, the potentials of the signal lines SGL_Bn−1, SGL_Rn, SGL_Gn, and SGL_Bn are also turned to 0 during the stop period TR_k+1. Therefore, the potential changes in the signal lines SGL when a scan line GCL is first selected immediately after the transition from the stop period TR_k+1 to the display period TI_k+2 differ from the potential changes in the signal lines SGL during the display period TI_k+1, as illustrated in FIG. 11.

Also in the present example, only in a row corresponding to Odd_q+2, the adjacent signal lines SGL are peculiarly coupled with each other by the electrostatic capacitance. This results in differences in potential of the sub-pixels SPix between the sub-pixels SPix of a row corresponding to Odd_q+2 and the sub-pixels SPix of the other rows, each of which that are supposed to display the same gradation. In the example illustrated in FIG. 11, the dotted line representing the potential of the sub-pixel SPixG indicates the potential in a row corresponding to Odd_q+2, and the solid line representing the potential of the sub-pixel SPixG indicates the potential in the other rows. The potential difference ΔVg caused by the above-described phenomenon can generate, for example, the streak defects or the unevenness between the sub-pixels SPix of a row corresponding to Odd_q+2 and the sub-pixels SPix of other rows adjacent thereto.

Control According to Present Embodiment

To reduce the generation of, for example, the streak defects or the unevenness when alternately repeating the display period TI and the stop period TR during one frame period, the display device 1 performs control so that the potential changes in the signal lines SGL immediately after the transition from a stop period TR to a display period TI are equal to the potential changes in the signal lines SGL during a display period TI before the stop period TR. A description will be made of the control of the display device 1 during the stop period TR, more specifically, the control performed by the control unit 11 as the display control unit, the source driver 13, etc.

Figure 12:
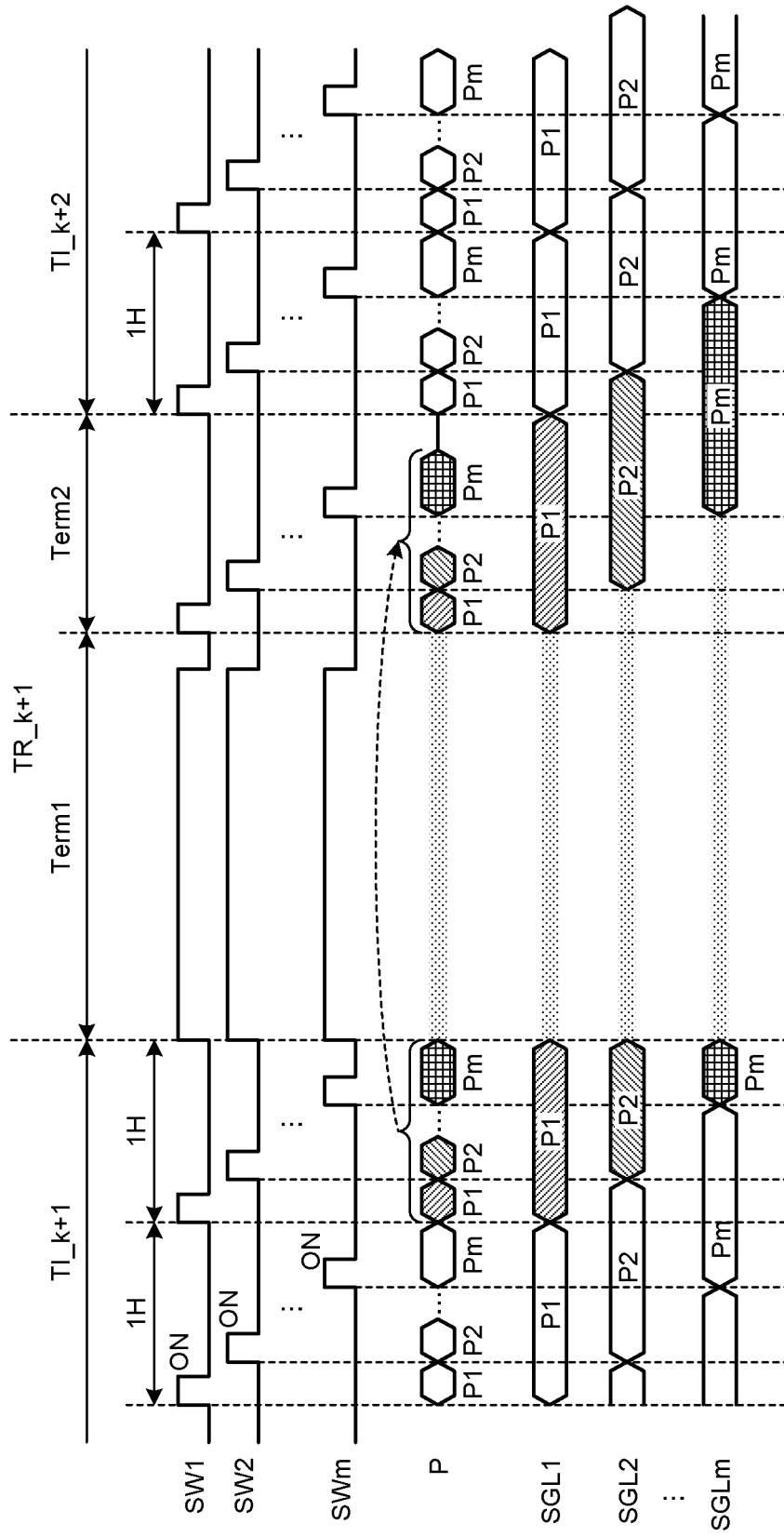
FIG. 12 is a timing chart illustrating an example of control during a stop period according to the embodiment.

FIG. 12 is a timing chart illustrating an example of the control during the stop period according to the present embodiment. In the control during the stop period (hereinafter called "stop control" as appropriate) according to the present embodiment, the display control unit sets all of the signal lines SGL to have a predetermined potential during the former term of the stop period TR. On the other hand, during the latter term of the stop period TR, the display control unit supplies the pixel signals Vpix written to the respective sub-pixels SPix included in a row that has been selected during the last one horizontal scanning period 1H in the display period TI immediately before the stop period TR to the signal lines SGL corresponding to the respective sub-pixels SPix. Controlling in this way equalizes the potential changes in the signal lines SGL immediately after the transition from a stop period TR to a display period TI to the potential changes in the signal lines SGL during a display period TI before the stop period TR. This can reduce, for example, the streak defects or the unevenness generated between the sub-pixels SPix of a row first selected immediately after the transition from the stop period TR to the display period TI and the sub-pixels SPix of other rows.

The numbers and m (m is a natural number of 2 or more) attached to the symbols SGL and P in FIG. 12 (and similar figures below) are used for identifying the type of colors displayed by the display device 1. For example, m=3 when the display device 1 displays the three colors of R, G, and B, and m=4 when the display device 1 displays the three colors of R, G, and B and an additional color white (W). The symbol P in FIG. 12 represents display data written to the sub-pixels SPix. Each of P1, P2, . . . , and Pm represents display data written to each of the sub-pixels SPix, and corresponds to, for example, the pixel signal Vpix. The display control device of the display device 1 drives each of the sub-pixels SPix included in one pixel on a time-division basis. In other words, the display data P is written in the order of P1, P2, . . . , and Pm to the corresponding sub-pixels SPix.

In the stop control according to the present embodiment, the stop period TR_k+1 is divided into a former term Term1 and a latter term Term2, as illustrated in FIG. 12. In the present embodiment, a transition from the display period TI_k+1 to the stop period TR_k+1 causes the display control unit to turn on all switches SW1, SW2, . . . , and SWm. When m=3, the switches SW1, SW2, . . . , and SWm correspond to the switches SWR, SWG, and SWB included in the source selector 13S illustrated in FIG. 6.

After all of the switches SW1, SW2, . . . , and SWm are turned on, the display control unit, more specifically, the control unit 11 illustrated in FIG. 1, sets all signal lines SGL1, SGL2, . . . , and SGLm coupled to the switches SW1, SW2, . . . , and SWm, respectively, to have the predetermined potential (charges all the signal lines to have the predetermined potential) via the source driver 13. The potential may have any value. The control unit 11 turns off all of the switches SW1, SW2, . . . , and SWm immediately before the end of the former term Term1 of the stop period TR_k+1. When the latter term Term2 of the stop period TR_k+1 begins, the control unit 11 illustrated in FIG. 1 supplies the signal lines SGL1, SGL2, . . . , and SGLm corresponding to the respective pixels (sub-pixels SPix), via the source driver 13, with the display data P1, P2, . . . , and Pm written to the respective pixels (sub-pixels SPix) included in a row that has been selected during the last one horizontal scanning period 1H in the display period TI_k+1 immediately before the stop period TR_k+1.

The display data P1, P2, . . . , and Pm written to the respective signal lines SGL in the latter term Term2 are the display data P1, P2, . . . , and Pm that have been written in the respective sub-pixels SPix during one horizontal scanning period 1H immediately before the stop period TR_k+1. One horizontal scanning period 1H corresponds to a time in which the pieces of display data are written to the sub-pixels SPix of one horizontal line coupled to the scan line GCL selected by the gate driver 12 illustrated in FIG. 2. After the end of the display period TI_k+1, the control unit 11 temporarily stores the display data P1, P2, . . . , and Pm, for example, in a storage unit. Then, in the latter term Term2, the control unit 11 sequentially turns on the switches SW1, SW2, . . . , and SWm while sequentially reading the display data P1, P2, . . . , and Pm from the storage unit mentioned above so as to write the display data to the corresponding signal lines SGL (charge the signal lines SGL). After the transition from the stop period TR_k+1 to the next display period TI_k+2, the control unit 11 drives the gate driver 12 and the source driver 13 to perform display of the remaining horizontal lines (the scan lines GCL and groups of the sub-pixels SPix coupled thereto).

In the latter term Term2, the display device 1 writes the display data P1, P2, . . . , and Pm that have been displayed during one horizontal scanning period 1H immediately before the stop period TR_k+1 to the corresponding signal lines SGL. This allows the display device 1 to substantially equalize the potential changes in the signal lines SGL immediately after the transition from the stop period TR_k+1 to the display period TI_k+2 to the potential changes in the signal lines SGL during the display period TI before the stop period TR. This allows the display device 1 to reduce, for example, the streak defects or the unevenness generated between the sub-pixels SPix of a row first selected immediately after the transition from the stop period TR_k+1 to the display period TI_k+2 and the sub-pixels SPix of other rows.

The display device 1 turns on all of the switches SW1, SW2, . . . , and SWm in the former term Term1, and can thereby set all of the signal lines SGL coupled thereto to have any desirable potential. For example, fixing the potential of all of the signal lines SGL to a predetermined value during the former term Term1 desirably improves resistance to disturbance noise. The time of keeping on all of the switches SW1, SW2, . . . , and SWm in the former term Term1 is preferably, but not limited to be, longer from the viewpoint of improving the resistance to disturbance noise.

The control unit 11 writes the display data P1, P2, ..., and Pm that have been displayed during the last one horizontal scanning period 1H to the corresponding signal lines SGL. This allows the driving method, that is, the on-off timing, of the switches SW1, SW2, ..., and SWm in the latter term Term2 to be the same as that in the display periods TI_k+1, TI_k+2, etc. This can minimize additions and changes in the logic of the control unit 11.

In the latter term Term2 of the stop period TR, the display control unit, more specifically, the control unit 11 may eliminate providing the display data P to the signal line SGL corresponding to a pixel Pix (specifically, sub-pixels SPix included in the pixels Pix) to which the display data is written first, among the pixels a row selected by the gate driver 12. In the present example, the display data P1 is first written to the sub-pixel SPix corresponding to the signal line SGL1, among the sub-pixels SPix included in the pixels Pix. For example, the pixel Pix includes SPixR, SPixG, and SPixB for displaying R, G, and B, respectively, as sub-pixels, and the display data P is first written to the sub-pixel SPixR for displaying R.

In the latter term Term2 of the stop period TR_k+1, the control unit 11 does not write the display data P1 that has been displayed during one horizontal scanning period 1H immediately before the stop period TR_k+1 to the signal line SGL1. The signal line SGL1 coupled to the pixel (sub-pixel coupled to the signal line SGL1 in the present example) to which the display data P is written first is not affected by potential changes in the signal lines SGL2, ..., and SGLm coupled with the other sub-pixels if the potential changes in those signal lines are the same between the display periods TI_k+1 and TI_k+2 before and after the stop period TR_k+1. In the latter term Term2 of the stop period TR_k+1, the control unit 11 can eliminate providing the display data P to the signal line SGL to which the display data P is written first, and thus only need to write the display data P to the (m−1) signal lines SGL in the latter term Term2 for each pixel Pix. This results in shortening the latter term Term2 of the display device 1. A procedure of the stop control according to the present embodiment will be briefly described.

Figure 13:
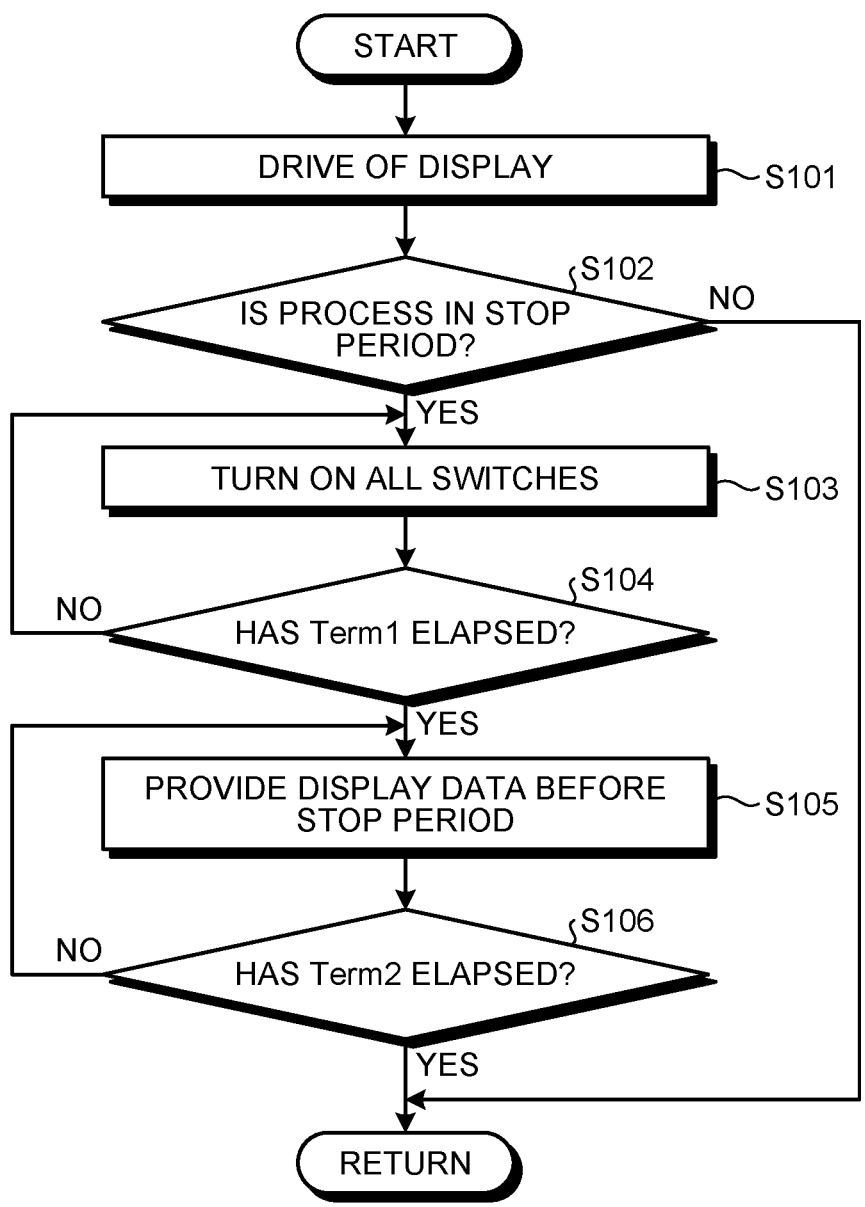
FIG. 13 is a flowchart illustrating a procedure of the stop control according to the embodiment.

FIG. 13 is a flowchart illustrating the procedure of the stop control according to the present embodiment. To perform the stop control according to the present embodiment, the display control unit, more specifically, the control unit 11 of the display device 1 drives display of the liquid crystal display unit 10 included in the display device 1 at Step S101. Then, the control unit 11 performs the process at Step S102, and, if the process is in the stop period TR (Yes at Step S102), the control unit 11 performs processing of Step S103. If the process is not in the stop period TR (No at Step S102), the control unit 11 returns to the start and performs the processes from Step S101.

At Step S103, the control unit 11 turns on all of the switches SW1, SW2, ..., and SWm, and then charges all of the signal lines SGL1, SGL2, ..., and SGLm coupled to the respective switches SW1, SW2, ..., and SWm to have the predetermined potential via the source driver 13. Then, the control unit 11 performs the process at Step S104, and, if the former term Term1 has elapsed (Yes at Step S104), the control unit 11 performs the process at Step S105. If the former term Term1 has not elapsed (No at Step S104), the control unit 11 repeats the processes at Steps S103 and S104.

Step S105 is the process of the latter term Term2 of the stop period TR. The control unit 11 provides the display data P1, P2, ..., and Pm written to the respective sub-pixels SPix in a row that has been selected during the last one horizontal scanning period 1H in the display period TI immediately before the stop period TR to the signal lines SGL1, SGL2, ..., and SGLm corresponding to the respective sub-pixels SPix. If the latter term Term2 has not elapsed (No at Step S106), the control unit 11 repeats Steps S105 and S106. If the latter term Term2 has elapsed (Yes at Step S106), the control unit 11 returns to the start and performs the processes from Step S101. Performing these processes allows the control unit 11 to reduce, for example, the streak defects or the unevenness generated in the display area Ad of the liquid crystal display unit 10 of the display device 1.

First Modification

In the former term Term1 of the stop period TR, stop control according to a first modification of the embodiment supplies the signal lines SGL with the respective pieces of the display data P that have been written in any pixel (sub-pixel SPix) except the pixel (sub-pixel SPix) to which the display data P is written first, among the respective pixels (respective sub-pixels SPix) in a row that has been selected during the last one horizontal scanning period 1H in the last display period TI. In the latter term Term2 of the stop period TR, the stop control according to the first modification provides, among the pieces of display data P written in the respective pixels (respective sub-pixels SPix) in a row that has been selected during the last one horizontal scanning period 1H in the last display period TI, display data other than the display data P that has been written in the pixel (sub-pixel SPix) to which the display data P is written first and the display data P that has been given to the signal lines SGL in the former term Term1 of the stop period TR, to the signal line SGL corresponding to the pixel (sub-pixel SPix) in which the display data has been written. Controlling in this way can reduce, for example, the streak defects or the unevenness, and can also shorten the time of the latter term Term2 of the stop period TR.

Figure 14:
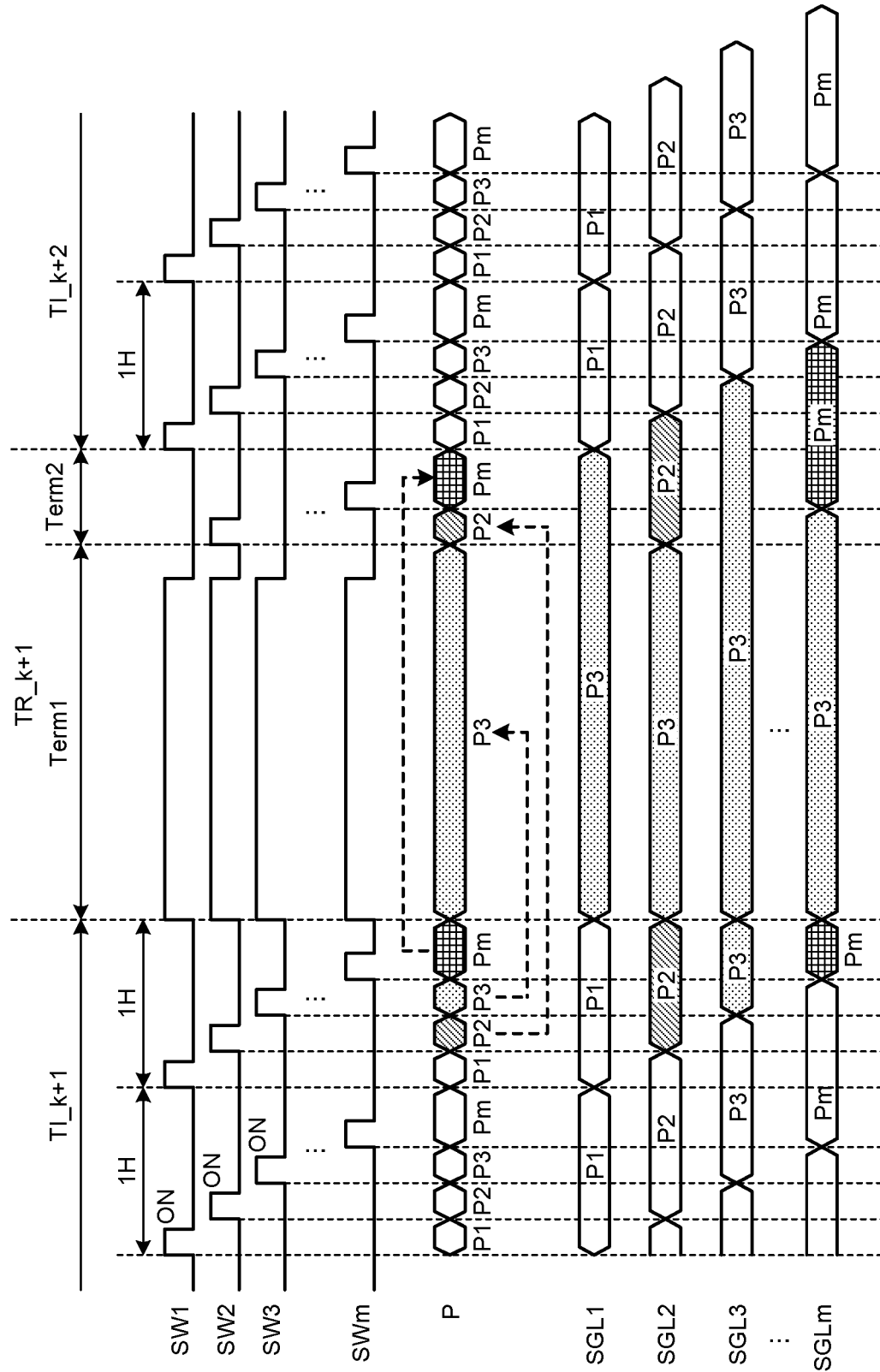
FIG. 14 is a timing chart illustrating an example of stop control according to a first modification of the embodiment.

FIG. 14 is a timing chart illustrating an example of the stop control according to the first modification. In the stop control according to the first modification, the transition from the display period TI_k+1 to the stop period TR_k+1 causes the display control unit, more specifically, the control unit 11 to turn on all of the switches SW1, SW2, ..., and SWm. After turning on all of the switches SW1, SW2, ..., and SWm, the control unit 11 provides the display data P3 via the source driver 13 to all of the signal lines SGL1, SGL2, ..., and SGLm coupled to the respective switches SW1, SW2, ..., and SWm. The display data P3 has been written in any one of the sub-pixels SPix except the sub-pixel SPix to which the display data P1 is written first, among the sub-pixels SPix in a row that has been selected during the last one horizontal scanning period 1H in the last display period TI_k+1. In the present example, the display data P1 is first written to the sub-pixel SPix corresponding to the signal line SGL1, among the sub-pixels SPix included in the pixels Pix. In the former term Term1, all of the signal lines SGL1, SGL2, ..., and SGLm only need to be given any of the display data P2, P3, ..., and Pm that have been written in the sub-pixels SPix except the sub-pixel SPix corresponding to the signal line SGL1 to which the display data P1 is written first, among the sub-pixels SPix corresponding to the signal lines SGL1, SGL2, SGL3, ..., and SGLm.

The control unit 11 turns off all of the switches SW1, SW2, ..., and SWm immediately before the end of the former term Term1 of the stop period TR_k+1. When the latter term Term2 of the stop period TR_k+1 begins, the control unit 11 provides the display data P2, . . . , Pm obtained by excluding the display data P1 and P3 from the display data P1, P2, P3, . . . , and Pm to the corresponding signal lines SGL2, and SGLm via the source driver 13. In other words, the signal lines SGL2, . . . , and SGLm are supplied with the display data P2, . . . , and Pm excluding the display data P1 that has been written in the sub-pixel SPix to which the display data P is written first and the display data P3 that has been written to the signal lines SGL1, SGL2, SGL3, . . . , and SGLm in the former term Term1. In the latter term Term2 of the stop period TR_k+1, the display data P2, . . . , and Pm are not written to the signal line SGL to which the display data P1 is written first and the signal line SGL corresponding to the display data P3 that has been written to the signal lines SGL1, SGL2, SGL3, . . . , and SGLm in the former term Term1. During the latter term Term2, these signal lines SGL are held to maintain the display data P3 written in the former term Term1.

The display data P3 written to the sub-pixels SPix in the former term Term1 is any of the display data P1, P2, . . . , and Pm that have been written in the sub-pixels SPix during one horizontal scanning period 1H immediately before the stop period TR_k+1 except the display data P1. In the latter term Term2, the display data P2, . . . , and Pm during one horizontal scanning period 1H immediately before the stop period TR_k+1 are written to the sub-pixels SPix to which the pieces of display data except the display data P1 and P3 have been written during one horizontal scanning period 1H immediately before the stop period TR_k+1.

After the end of the display period TI_k+1, the control unit 11 temporarily stores the display data P2, P3, . . . , and Pm excluding the display data P1 during the last one horizontal scanning period 1H, for example, in the storage unit. Then, in the former term Term1, the control unit 11 reads the display data P3 from the storage unit, and writes the display data P3 to all of the signal lines SGL (charges the signal lines SGL). In the latter term Term2, the control unit 11 sequentially reads the display data P2, . . . , and Pm excluding the display data P3 from the storage unit, and writes the display data P2, . . . , and Pm to the corresponding signal lines SGL (charges the signal lines SGL). After the transition from the stop period TR_k+1 to the next display period TI_k+2, the control unit 11 drives the gate driver 12 and the source driver 13 to perform display of the remaining horizontal lines (the scan lines GCL and groups of the sub-pixels SPix coupled thereto).

The stop control as described above causes the display device 1 to write, during the latter term Term2, the display data P2, . . . , and Pm that have been displayed during one horizontal scanning period 1H immediately before the stop period TR_k+1 to the signal lines SGL except the signal line SGL1 to which the display data P1 is written first and the signal line SGL3 originally corresponding to the display data P3 that has been written to the signal lines SGL during the former term Term1. Any one of the pieces of display data P2, P3, . . . , and Pm is written to the signal line to which the display data P1 is written first. This allows the display device 1 to substantially equalize the potential changes in the signal lines SGL immediately after the transition from the stop period TR_k+1 to the display period TI_k+2 to the potential changes in the signal lines SGL during the display period TI before the stop period TR. This allows the display device 1 to reduce, for example, the streak defects or the unevenness generated between the sub-pixels SPix of a row first selected immediately after the transition from the stop period TR_k+1 to the display period TI_k+2 and the sub-pixels SPix of other rows.

In the former term Term1, the display device 1 turns on all of the switches SW1, SW2, . . . , and SWm, and writes the display data P3 to all of the signal lines SGL1, SGL2, SGL3, . . . , and SGLm, thereby fixing all of the signal lines SGL1, SGL2, SGL3, . . . , and SGLm to the predetermined potential. This improves the resistance of the display device 1 to disturbance noise. The first modification only needs to write the display data P to the (m−2) signal lines SGL for each pixel Pix in the latter term Term2, and thus can shorten the latter term Term2. A procedure of the stop control according to the first modification will be briefly described.

Figure 15:
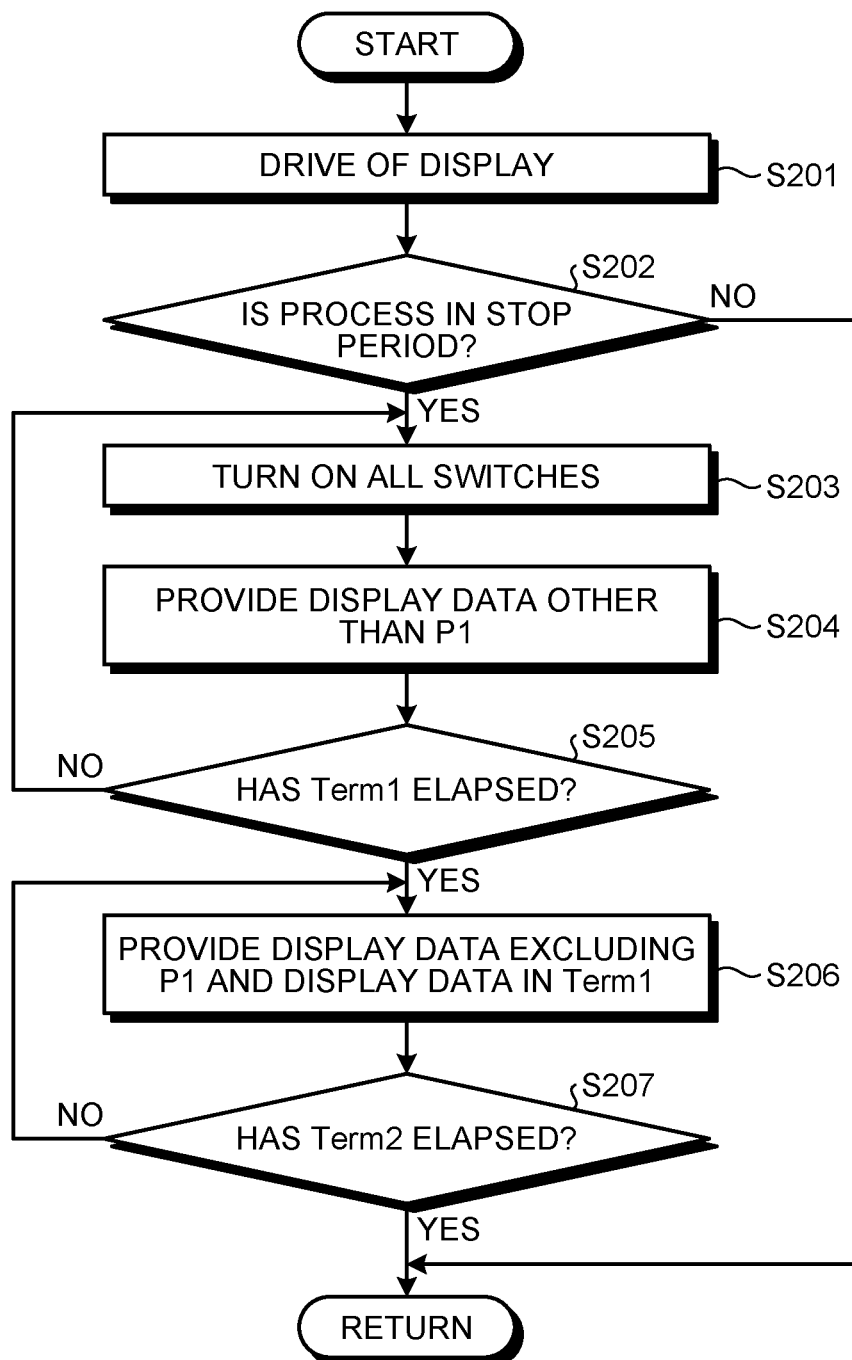
FIG. 15 is a flowchart illustrating a procedure of the stop control according to the first modification.

FIG. 15 is a flowchart illustrating the procedure of the stop control according to the first modification. Steps S201 to S203 of the stop control according to the first modification are the same as Steps S101 to S103 of the above-described stop control, and thus description thereof will not be repeated. At Step S204, the control unit 11 provides display data other than P1 (the display data P3 in the present example) via the source driver 13 to all of the signal lines SGL1, SGL2, . . . , and SGLm coupled to the respective switches SW1, SW2, . . . , and SWm. The control unit 11 performs the process at Step S205, and, if the former term Term1 has elapsed (Yes at Step S205), the control unit 11 performs the process at Step S206. If the former term Term1 has not elapsed (No at Step S205), the control unit 11 repeats the processes at Steps S203 to S205.

Step S206 is the process of the latter term Term2 of the stop period TR. The control unit 11 provides the display data P2, . . . , and Pm excluding the display data P1 and the display data P3 that has been written to all of the signal lines SGL during the former term Term1 to the corresponding signal lines SGL2, . . . , and SGLm. If the latter term Term2 has not elapsed (No at Step S207), the control unit 11 repeats Steps S206 and S207. If the latter term Term2 has elapsed (Yes at Step S207), the control unit 11 returns to the start and performs the processes from Step S201. Performing these processes allows the control unit 11 to reduce, for example, the streak defects or the unevenness generated in the display area Ad of the liquid crystal display unit 10 of the display device 1.

Second Modification

During the stop period TR, stop control according to a second modification of the embodiment turns off all of the switches, and sets the wiring from a transmission source of the display data to the switches to have any desirable potential.

Figure 16:
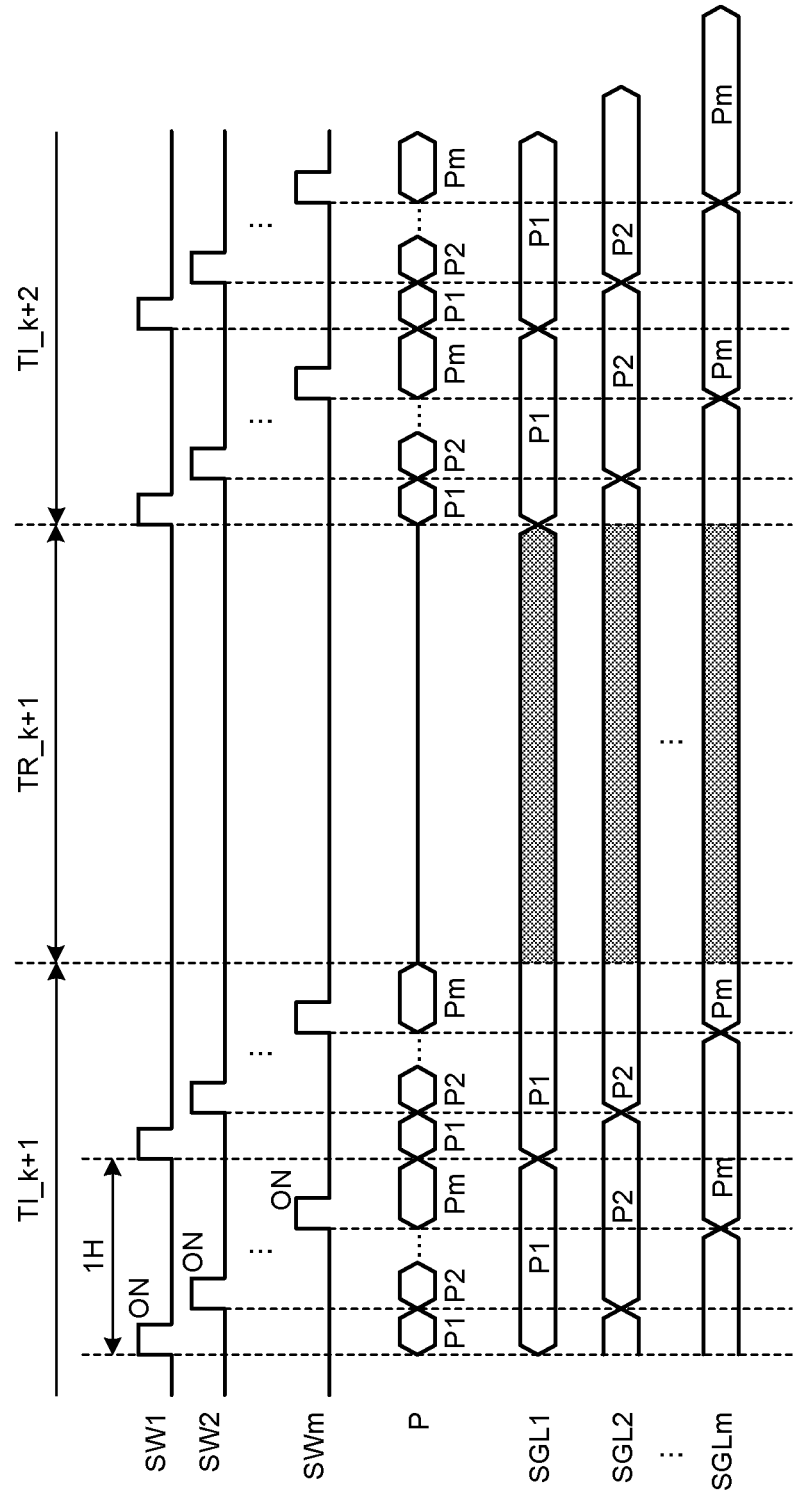
FIG. 16 is a timing chart illustrating an example of stop control according to a second modification of the embodiment.
Figure 17:
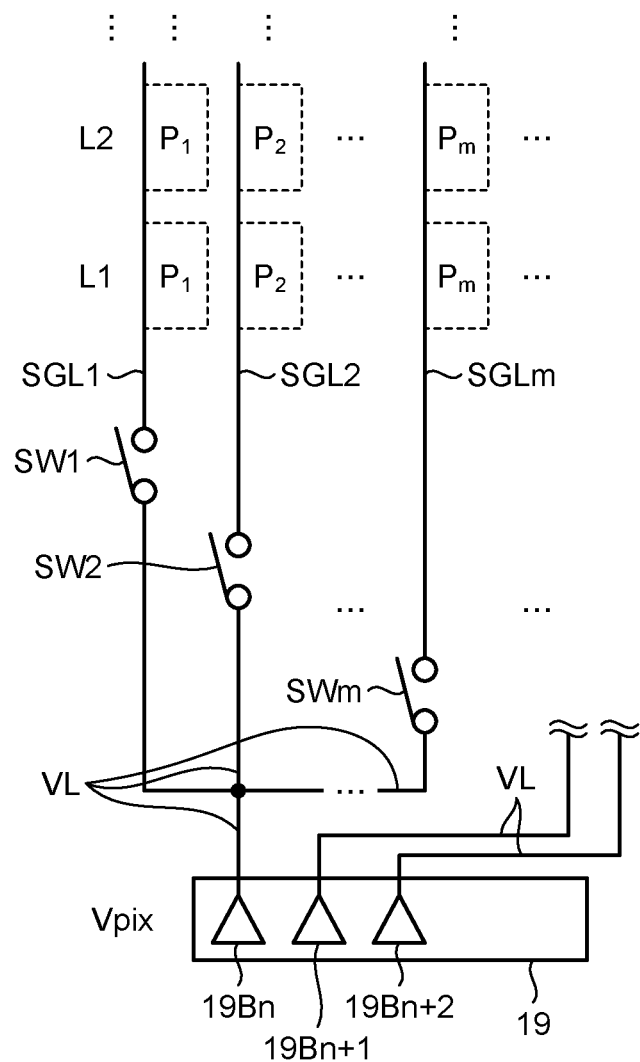
FIG. 17 is a diagram illustrating a chip on glass (COG), switches, and wiring coupling the COG with the switches.
Figure 18:
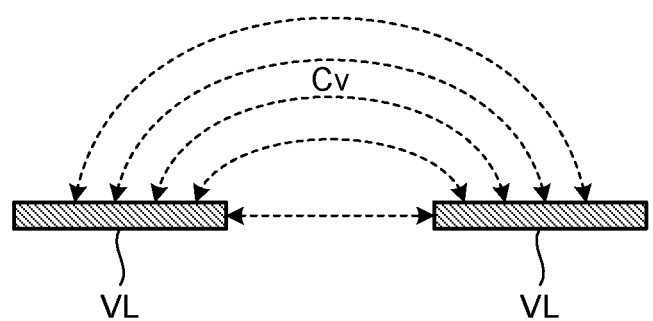
FIG. 18 is a sectional view of the wiring coupling the COG with the switches.

FIG. 16 is a timing chart illustrating an example of the stop control according to the second modification. FIG. 17 is a diagram illustrating the COG, the switches, and the wiring coupling the COG with the switches. FIG. 18 is a sectional view of the wiring coupling the COG with the switches. In the stop control according to the second modification, the display control unit, more specifically, the control unit 11 illustrated in FIG. 1, turns off all of the switches SW1, SW2, . . . , and SWm during the stop period TR_k+1. Controlling in this way places the signal lines SGL1, SGL2, . . . , and SGLm coupled to the respective switches SW1, SW2, . . . , and SWm in a state of high impedance, and thus holds the signal lines SGL1, SGL2, . . . , and SGLm in the state of being given the display data P1, P2, . . . , and Pm of one horizontal scanning period 1H immediately before the stop period TR_k+1, during the stop period TR_k+1. This holds the respective sub-pixels SPix coupled to the signal lines SGL1, SGL2, . . . , and SGLm in the state in which the display data P1, P2, . . . , and Pm of one horizontal scanning period 1H immediately before the stop period TR_k+1 are written therein.

The stop control according to the second modification can substantially equalize the potential changes in the signal lines SGL immediately after the transition from the stop period TR_k+1 to the display period TI_k+2 to the potential changes in the signal lines SGL during the display period TI before the stop period TR. This allows the display device 1 to reduce, for example, the streak defects or the unevenness generated between the sub-pixels SPix in a row first selected immediately after the transition from the stop period TR_k+1 to the display period TI_k+2 and the sub-pixels SPix of other rows. The stop control according to the second modification does not require the division of the stop period TR_k+1 into the former and the latter terms, thus eliminating the need for securing the latter term of the stop period TR_k+1. This allows the stop control according to the second modification to limit the stop period TR_k+1 to the necessary minimum.

While turning off the switches SW1, SW2, . . . , and SWm sets the signal lines SGL1, SGL2, . . . , and SGLm coupled thereto to have the high impedance during the stop period TR_k+1, the signal lines SGL1, SGL2, . . . , and SGLm have relatively large components Cc, Cg, and Ct of the electrostatic capacitance. In addition, the common electrodes COML illustrated in FIG. 2, for example, face the signal lines SGL1, SGL2, and SGLm, and thus play a role of shielding against electromagnetism. This gives the signal lines SGL1, SGL2, . . . , and SGLm relatively high resistance to disturbance noise. Cc is the electrostatic capacitance between the signal lines and the common electrodes COML; Cg is the electrostatic capacitance at portions where the signal lines SGL intersect the scan lines GCL; and Ct is the electrostatic capacitance between the signal lines SGL and the TFT elements Tr included in the sub-pixels SPix. Ct is the electrostatic capacitance when the TFT elements Tr are turned off.

As illustrated in FIG. 17, the COG 19 serving as the transmission source of the display data P is coupled with the switches SW1, SW2, . . . , and SWm by video lines VL serving as the wiring. Electrostatic capacitance Cv exists between the adjacent video lines VL, VL illustrated in FIG. 18 mostly due to a fringe electric field formed between the adjacent video lines VL. As many as several hundreds to over one thousand of the video lines VL are arranged at the frames Gd of the liquid crystal display unit 10 illustrated in FIG. 2. To contain the many video lines VL in the predetermined frames Gd, the video lines VL have small line widths and small lengths. This results in a relatively small value of Cv. The common electrodes COML do not face the video lines VL, and thus cannot be expected to have an effect of shielding against electromagnetism. As a result, during the stop period TR_k+1, the increasing impedance of outputs of amplifiers 19Bn, 19Bn+1, 19Bn+2, . . . included in the COG 19 causes the video lines VL to be vulnerable to disturbance noise.

If the disturbance noise received during the stop period TR_k+1 gives any of the video lines VL an extremely high potential or an extremely low potential, the potential of the video line VL may exceed a withstand voltage between the source and the drain of any of the switches SW1, SW2, . . . , and SWm. If the process enters the display period TI_k+2, and the respective video lines VL are coupled to the amplifiers 19Bn, 19Bn+1, 19Bn+2, . . . included in the COG 19 while any of the video lines VL has an extremely high potential or an extremely low potential, the potential of the video line VL may exceed a withstand voltage of any of the amplifiers 19Bn, 19Bn+1, 19Bn+2, . . . of the COG 19.

When performing the stop control according to the second modification, the control unit 11 turns off all of the switches SW1, SW2, . . . , and SWm and sets the video lines VL from the COG 19 to the switches SW1, SW2, . . . and SWm illustrated in FIG. 17 to have any desirable potential during the stop period TR_k+1. Controlling in this way can reduce the possibility that the potential of any of the video lines VL exceeds the withstand voltage between the source and the drain of any of the switches SW1, SW2, . . . , and SWm, or the withstand voltage of any of the amplifiers 19Bn, 19Bn+1, 19Bn+2, . . . of the COG 19. A procedure of the stop control according to the second modification will be briefly described.

Figure 19:
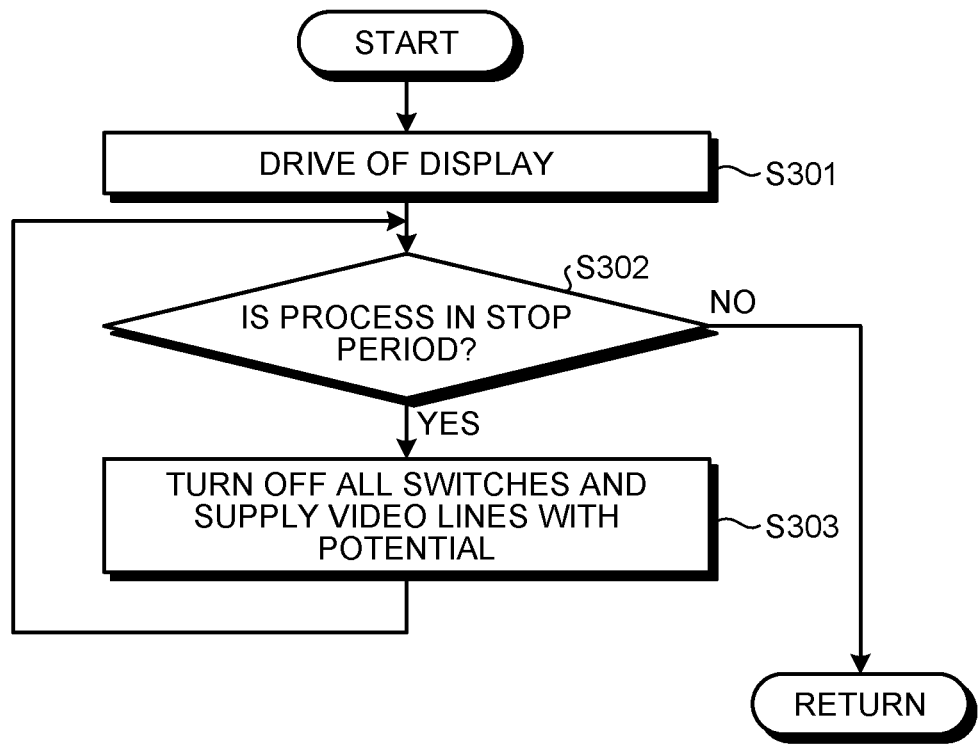
FIG. 19 is a flowchart illustrating the procedure of the stop control according to the first modification.

FIG. 19 is a flowchart illustrating the procedure of the stop control according to the first modification. Steps S301 and S302 of the stop control according to the second modification are the same as Steps S101 and S102 of the above-described stop control, and thus description thereof will not be repeated. If the process is in the stop period TR_k+1 (Yes at Step S302), the control unit 11 turns off all of the switches SW1, SW2, . . . , and SWm and supplies all of the video lines VL with any desirable potential via the COG 19 at Step S303. If the process is not in the stop period TR_k+1 (No at Step S302), the control unit 11 returns to the start and performs the processes from Step S301. Performing these processes allows the control unit 11 to reduce, for example, the streak defects or the unevenness generated in the display area Ad of the liquid crystal display unit 10 of the display device 1. In addition, it becomes less possible that the potential of any of the video lines VL exceeds the above-mentioned withstand voltage, so that deterioration in durability of the source selector 13S illustrated in FIG. 6 and the COG 19 illustrated in FIG. 17 is suppressed.

1-2. Display Device with Touch Detection Function

In the present embodiment and the modifications thereof, the display device 1 may have a function other than the display function. A description will be made below of a display device with a touch detection function that has a touch detection function. The display device with the touch detection function performs driving for detecting a touch during the stop period TR.

Figure 20:
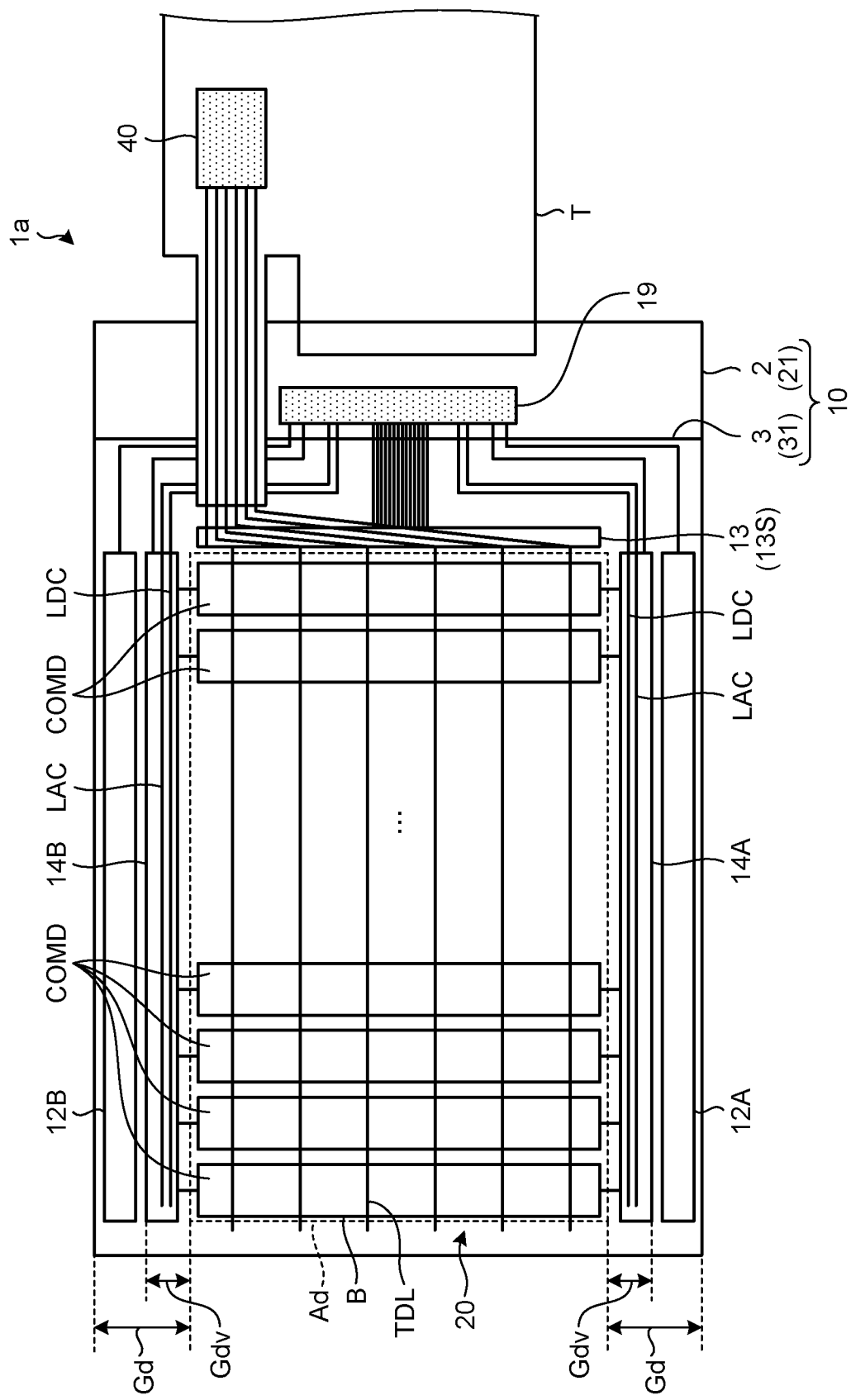
FIG. 20 is a diagram illustrating an example of a display device with a touch detection function.

FIG. 20 is a diagram illustrating an example of the display device with the touch detection function. This display device with the touch detection function 1a in the present embodiment detects a touch by using capacitative type touch detection. As illustrated in FIG. 20, the display device with the touch detection function 1a includes the liquid crystal display unit 10 and a touch detection device 20. The touch detection device 20 in the present example uses the common electrodes COML of the liquid crystal display unit 10 also as drive electrodes COMD. However, the drive electrodes COMD are not limited to such a type. Drive electrode scanning units 14A and 14B for driving the drive electrodes COMD are formed on the TFT substrate 21. As illustrated in FIG. 20, drive electrode blocks B of the drive electrodes COMD and touch detection electrodes TDL are arranged to cross each other three-dimensionally in a separate manner in the direction orthogonal to the surface of the TFT substrate 21.

The drive electrodes COMD have a shape divided into a plurality of stripe-like electrode patterns extending in one direction. When the touch detection operation is performed, the drive electrode scanning units 14A and 14B sequentially feed touch driving signals VcomAC to the respective electrode patterns of the drive electrodes COMD. The drive electrodes COMD of each of the stripe-like electrode patterns are simultaneously supplied with the touch driving signals VcomAC, and the stripe-like electrode patterns serve as the drive electrode blocks B illustrated in FIG. 20. The drive electrode blocks B (drive electrodes COMD) are formed in a direction along one side of the touch detection device 20, and the touch detection electrodes TDL are formed in a direction along another side of the touch detection device 20. Outputs of the touch detection electrodes TDL are provided, for example, on the above-mentioned one side of the touch detection device 20, and coupled via the flexible printed circuit board T to a touch detection unit 40 that is mounted on the flexible printed circuit board T. In this manner, the touch detection unit 40 is mounted on the flexible printed circuit board T, and coupled with each of the parallel-arranged touch detection electrodes TDL. The flexible printed circuit board T only needs to be a terminal, and is not limited to be a flexible printed circuit board. In this case, the touch detection unit 40 is provided outside the display device with the touch detection function 1a.

A drive signal generating unit for generating the touch driving signals VcomAC is embedded in the COG 19. The drive electrode scanning units 14A and 14B are disposed at the frames Gd, respectively. The drive electrode scanning units 14A and 14B are formed using TFT elements on the TFT substrate 21. The drive electrode scanning units 14A and 14B are supplied with the display driving voltage VCOM from the above-mentioned drive signal generating unit via the display wiring LDC, and supplied with the touch driving signals VcomAC via touch wiring LAC. The drive electrode scanning units 14A and 14B each occupy a certain width Gdv at the corresponding frame Gd. The drive electrode scanning units 14A and 14B can drive each of the parallel-arranged drive electrode blocks B from both sides. The display wiring LDC for feeding the display driving voltage VCOM and the touch wiring LAC for feeding the touch driving signals VcomAC are arranged parallel to each other at the frames Gd. The display wiring LDC is arranged on the side nearer to the display area Ad than the touch wiring LAC. This structure causes the display driving voltage VCOM fed by the display wiring LDC to stabilize potential states at ends of the display area Ad. This stabilizes the display particularly on the liquid crystal display unit using the liquid crystals of the horizontal electric field mode.

Basic Principle of Capacitative Type Touch Detection

Figure 21:
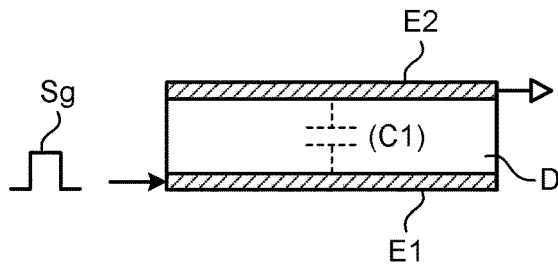
FIG. 21 is an explanatory diagram for explaining a basic principle of capacitative type touch detection, the diagram illustrating a state in which a finger is neither in contact with nor in proximity to a device.
Figure 22:
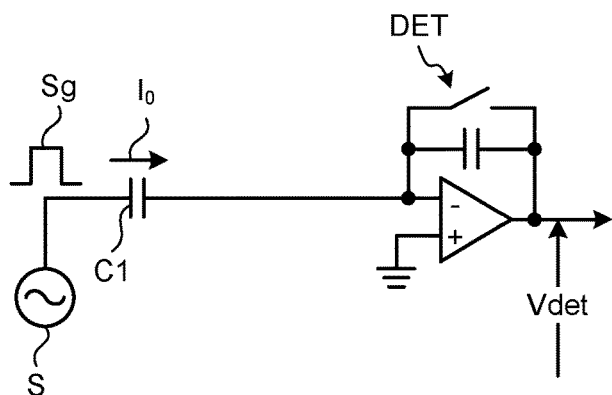
FIG. 22 is an explanatory diagram illustrating an example of an equivalent circuit in the state illustrated in FIG. 21 in which the finger is neither in contact with nor in proximity to a device.
Figure 23:
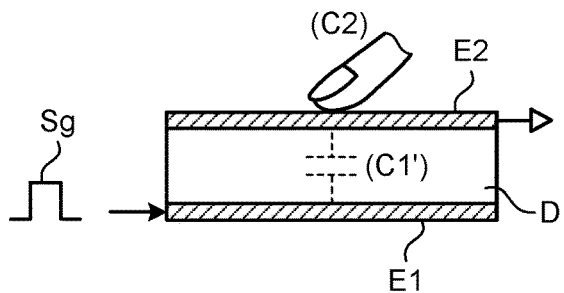
FIG. 23 is an explanatory diagram for explaining the basic principle of the capacitative type touch detection, the diagram illustrating a state in which the finger is in contact with or in proximity to a device.
Figure 24:
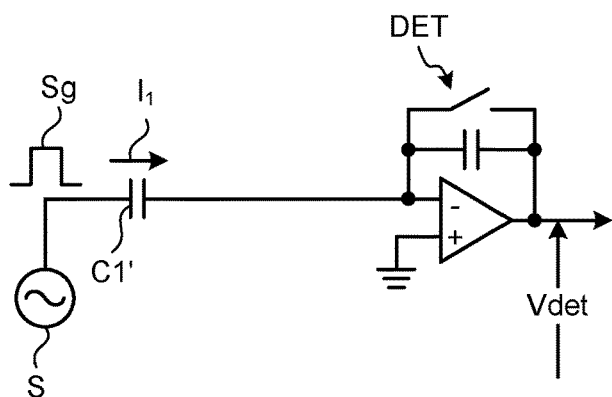
FIG. 24 is an explanatory diagram illustrating an example of the equivalent circuit in the state illustrated in FIG. 23 in which the finger is in contact with or in proximity to a device.
Figure 25:
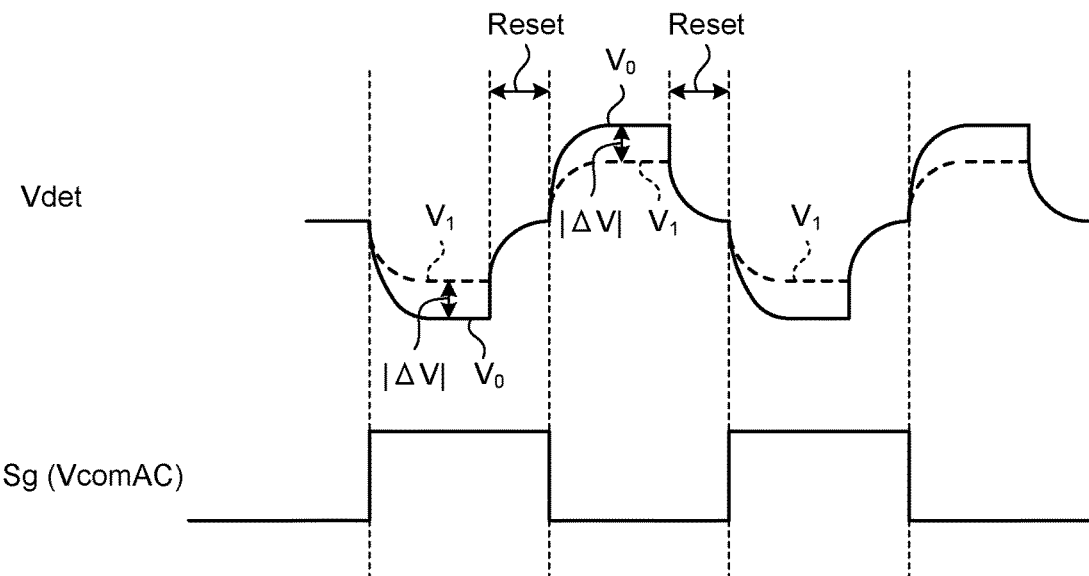
FIG. 25 is a diagram illustrating an example of waveforms of a drive signal and a touch detection signal.

FIG. 21 is an explanatory diagram for explaining a basic principle of the capacitative type touch detection, the diagram illustrating a state in which a finger is neither in contact with nor in proximity to a device. FIG. 22 is an explanatory diagram illustrating an example of an equivalent circuit in the state illustrated in FIG. 21 in which the finger is neither in contact with nor in proximity to a device. FIG. 23 is an explanatory diagram for explaining the basic principle of the capacitative type touch detection, the diagram illustrating a state in which the finger is in contact with or in proximity to a device. FIG. 24 is an explanatory diagram illustrating an example of the equivalent circuit in the state illustrated in FIG. 23 in which the finger is in contact with or in proximity to a device. FIG. 25 is a diagram illustrating an example of waveforms of a drive signal and a touch detection signal.

The touch detection device 20 illustrated in FIG. 20 operates based on the basic principle of the capacitative type touch detection, and outputs a touch detection signal Vdet. For example, as illustrated in FIG. 21, a capacitive element C1 includes a pair of electrodes, that is, a drive electrode E1 and a touch detection electrode E2 that are arranged facing each other with a dielectric body D interposed therebetween. As illustrated in FIG. 22, the capacitive element C1 is coupled, at one end thereof, to an alternating signal source (drive signal source) S, and coupled, at the other end thereof, to a voltage detector (touch detection unit) DET. The voltage detector DET is, for example, an integration circuit included in the touch detection unit 40 illustrated in FIG. 20.

Applying an alternating-current rectangular wave Sg having a predetermined frequency (such as approximately several kilohertz to several hundred kilohertz) from the alternating signal source S to the drive electrode E1 (one end of the capacitive element C1) causes an output waveform (touch detection signal Vdet) to occur via the voltage detector DET coupled to the side of the touch detection electrode E2 (the other end of the capacitive element C1). The alternating-current rectangular wave Sg corresponds to the touch driving signals VcomAC.

In the state (non-contact state) in which the finger is neither in contact with (nor in proximity to) a device, a current $I_0$ according to the capacitance value of the capacitive element C1 flows in association with the charge and discharge of the capacitive element C1, as illustrated in FIGS. 21 and 22. As illustrated in FIG. 25, the voltage detector DET converts a variation in the current $I_0$ according to the alternating-current rectangular wave Sg into a variation in a voltage (waveform $V_0$ of a solid line).

In the state (contact state) in which the finger is in contact with (or in proximity to) a device, electrostatic capacitance C2 produced by the finger exists in contact with or in proximity to the touch detection electrode E2, as illustrated in FIG. 23. Thus, a fringe component of the electrostatic capacitance existing between the drive electrode E1 and the touch detection electrode E2 is interrupted, and the electrostatic capacitance acts as a capacitive element C1' having a smaller capacitance value than that of the capacitive element C1. With reference to the equivalent circuit illustrated in FIG. 24, a current $I_1$ flows in the capacitive element C1'. As illustrated in FIG. 25, the voltage detector DET converts a variation in the current $I_1$ according to the alternating-current rectangular wave Sg into a variation in a voltage (waveform $V_1$ of a dotted line). In this case, the waveform $V_1$ has a smaller amplitude than that of the above-mentioned waveform $V_0$. This shows that the absolute value |ΔV| of a voltage difference between the waveform $V_0$ and the waveform $V_1$ changes according to an influence of an object, such as a finger, approaching from the outside. To accurately detect the absolute value |ΔV| of the voltage difference between the waveform $V_0$ and the waveform $V_1$, the voltage detector DET preferably performs an operation including a period Reset during which the charge or discharge of the capacitor is reset by switching in the circuit in accordance with the frequency of the alternating-current rectangular wave Sg.

The touch detection device 20 illustrated in FIG. 20 is configured to perform the touch detection by sequentially scanning one detection block at a time according to the touch driving signals VcomAC fed from the drive electrode scanning units 14A and 14B. The touch detection device 20 is configured to output the touch detection signals Vdet from the touch detection electrodes TDL via the voltage detectors DET illustrated in FIGS. 22 and 24 on a detection block basis, and transmit the touch detection signals Vdet to the touch detection unit 40.

The touch detection unit 40 performs processing to extract only the difference of signals due to the finger. The difference of signals due to the finger has the absolute value |ΔV| of the difference between the waveform $V_0$ and the waveform $V_1$ described above. The touch detection unit 40 compares the difference of signals due to the finger with a predetermined threshold voltage, and if the difference is the threshold voltage or more, determines that the state is the contact state of an external proximate object. The touch detection unit 40 compares the detected signal of the difference of signals due to the finger with the predetermined threshold voltage, and if the difference is less than the threshold voltage, determines that the state is the non-contact state of an external proximate object. The touch detection unit 40 can perform the touch detection in this manner. The detection of the touch causes the touch detection unit 40 to obtain touch panel coordinates of the touch, and to output the touch panel coordinates as a signal output Vout.

While the description has been made above of the embodiments and the modifications thereof, the above description does not limit the present disclosure. The constituent elements of the embodiments and the modifications thereof described above include elements easily conceived by those skilled in the art, substantially identical elements, and elements in the range of what are called equivalents. The above-described constituent elements can also be combined as appropriate. The constituent elements can be omitted, replaced, and/or modified in various ways within the scope not deviating from the gist of the present disclosure.

2. Application Examples

With reference to FIGS. 26 to 38, a description will be made of application examples of the display device 1 described in the embodiment and the modifications thereof. FIGS. 26 to 38 are diagrams each illustrating an example of an electronic apparatus to which the display device according to the present embodiment or any of the modifications thereof is applied. The display device 1 according to the present embodiment or the display device according to any of the modifications thereof can be applied to electronic apparatuses in all fields, such as television devices, digital cameras, laptop computers, portable electronic apparatuses including mobile phones, and video cameras. In other words, the display device 1 according to the present embodiment or the display device according to any of the modifications thereof can be applied to electronic apparatuses in all fields that display externally received video signals or internally generated video signals as images or video pictures.

Application Example 1

Figure 26:
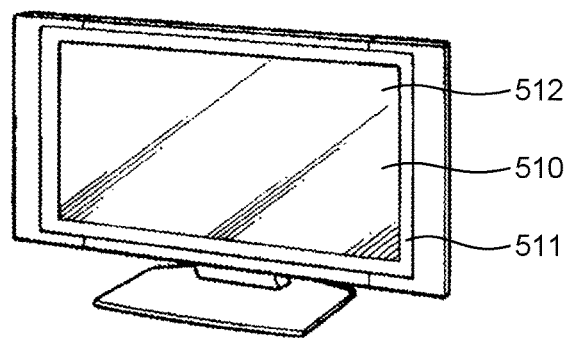
FIG. 26 is a diagram illustrating an example of an electronic apparatus to which the display device according to the embodiment or any of the modifications thereof is applied.

The electronic apparatus illustrated in FIG. 26 is a television device to which the display device 1 according to the present embodiment or the display device according to any of the modifications thereof is applied. This television device includes, for example, a video display screen unit 510 that includes a front panel 511 and a filter glass 512. The video display screen unit 510 corresponds to the display device 1 according to the present embodiment or the display device according to any of the modifications thereof.

Application Example 2

Figure 27:
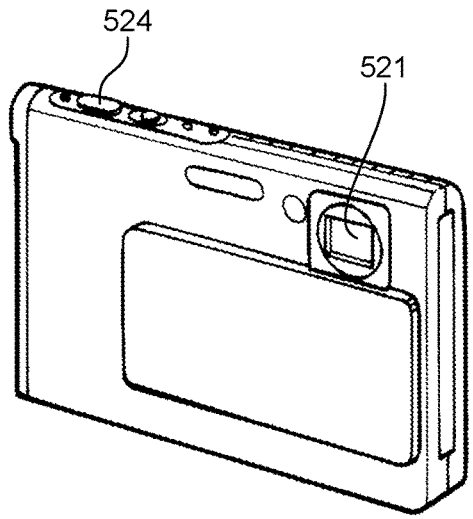
FIG. 27 is a diagram illustrating an example of an electronic apparatus to which the display device according to the embodiment or any of the modifications thereof is applied.
Figure 28:
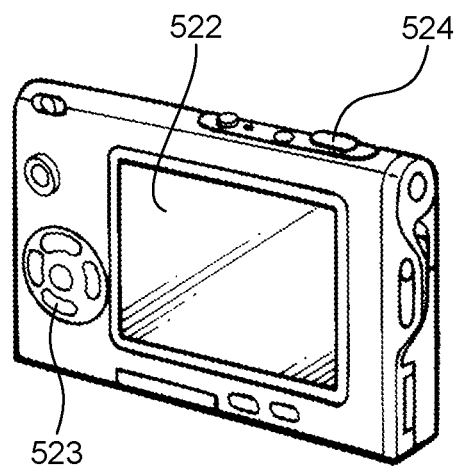
FIG. 28 is a diagram illustrating the example of the electronic apparatus to which the display device according to the embodiment or any of the modifications thereof is applied.

The electronic apparatus illustrated in FIGS. 27 and 28 is a digital camera to which the display device 1 according to the present embodiment or the display device according to any of the modifications thereof is applied. This digital camera includes, for example, a light-emitting unit 521 for flash, a display unit 522, a menu switch 523, and a shutter button 524. The display unit 522 corresponds to the display device 1 according to the present embodiment or the display device according to any of the modifications thereof.

Application Example 3

Figure 29:
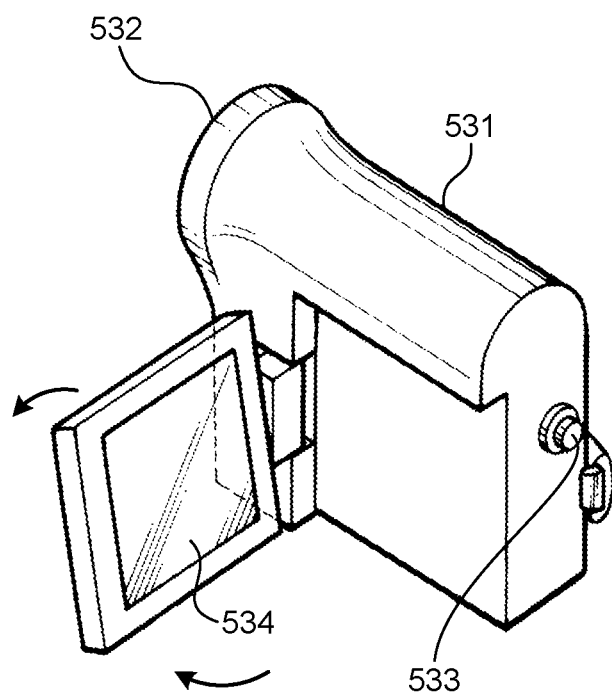
FIG. 29 is a diagram illustrating an example of an electronic apparatus to which the display device according to the embodiment or any of the modifications thereof is applied.

The electronic apparatus illustrated in FIG. 29 represents an external appearance of a video camera to which the display device 1 according to the present embodiment or the display device according to any of the modifications thereof is applied. This video camera includes, for example, a body 531, a lens 532 for taking a subject provided on the front side face of the body 531, and a start/stop switch 533 for shooting, and a display unit 534. The display unit 534 corresponds to the display device 1 according to the present embodiment or the display device according to any of the modifications thereof.

Application Example 4

Figure 30:
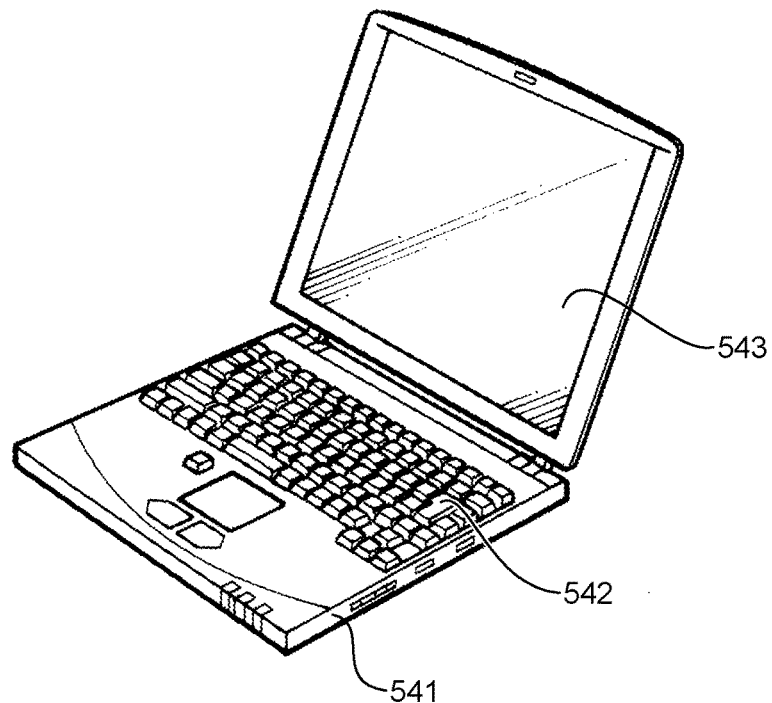
FIG. 30 is a diagram illustrating an example of an electronic apparatus to which the display device according to the embodiment or any of the modifications thereof is applied.
Figure 31:
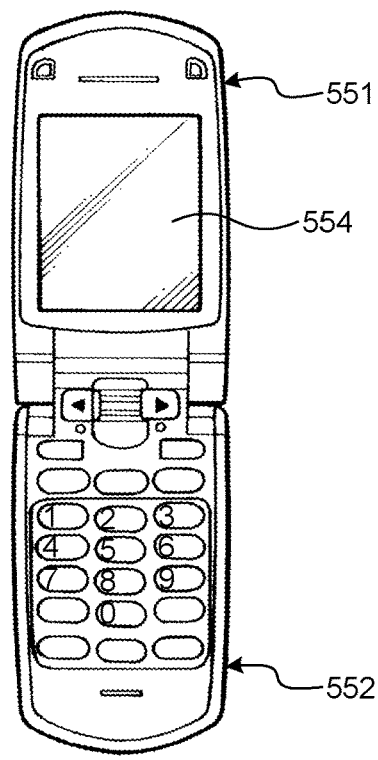
FIG. 31 is a diagram illustrating an example of an electronic apparatus to which the display device according to the embodiment or any of the modifications thereof is applied.
Figure 32:
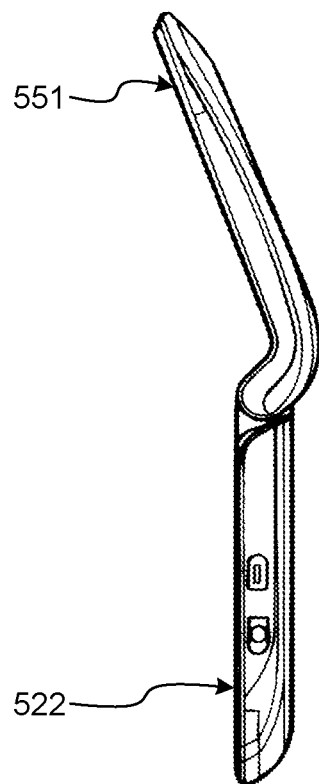
FIG. 32 is a diagram illustrating the example of the electronic apparatus to which the display device according to the embodiment or any of the modifications thereof is applied.
Figure 33:
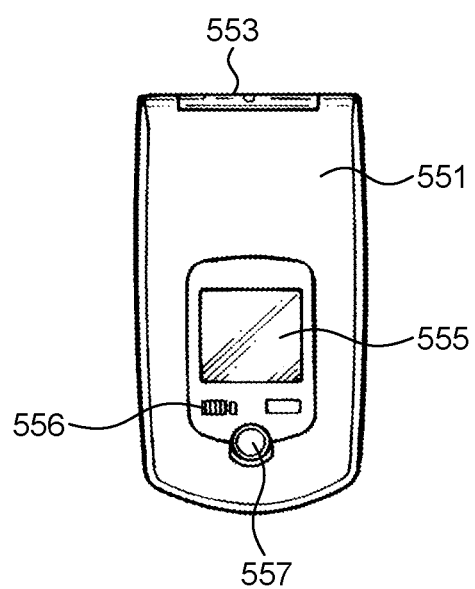
FIG. 33 is a diagram illustrating the example of the electronic apparatus to which the display device according to the embodiment or any of the modifications thereof is applied.
Figure 34:
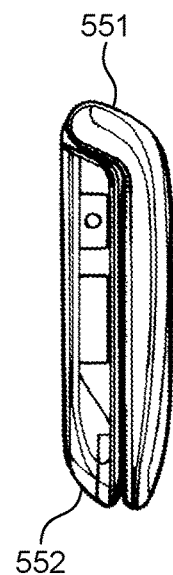
FIG. 34 is a diagram illustrating the example of the electronic apparatus to which the display device according to the embodiment or any of the modifications thereof is applied.
Figure 35:
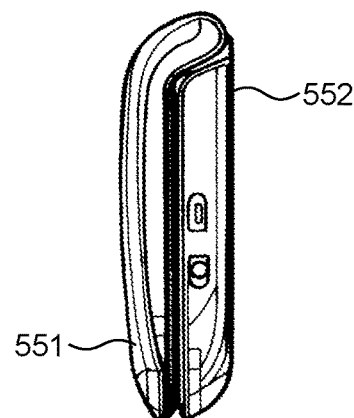
FIG. 35 is a diagram illustrating the example of the electronic apparatus to which the display device according to the embodiment or any of the modifications thereof is applied.
Figure 36:
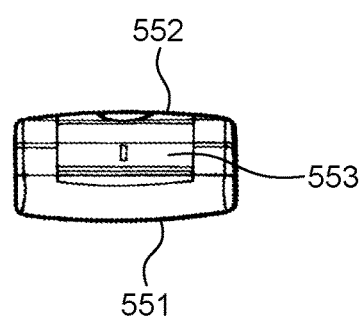
FIG. 36 is a diagram illustrating the example of the electronic apparatus to which the display device according to the embodiment or any of the modifications thereof is applied.
Figure 37:
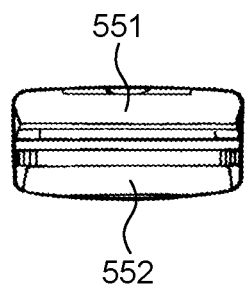
FIG. 37 is a diagram illustrating the example of the electronic apparatus to which the display device according to the embodiment or any of the modifications thereof is applied.

The electronic apparatus illustrated in FIG. 30 is a laptop computer to which the display device 1 according to the present embodiment or the display device according to any of the modifications thereof is applied. This laptop computer includes, for example, a body 541, a keyboard 542 for input operation of characters, etc., and a display unit 543 that displays images. The display unit 543 corresponds to the display device 1 according to the present embodiment or the display device according to any of the modifications thereof.

Application Example 5

The electronic apparatus illustrated in FIGS. 31 to 37 is a mobile phone to which the display device 1 according to the present embodiment or the display device according to any of the modifications thereof is applied. This mobile phone is, for example, composed of an upper housing 551 and a lower housing 552 connected to each other by a connection unit (hinge unit) 553, and includes a display 554, a subdisplay 555, a picture light 556, and a camera 557. The display 554 and/or the subdisplay 555 correspond(s) to the display device 1 according to the present embodiment or the display device according to any of the modifications thereof.

Application Example 6

Figure 38:
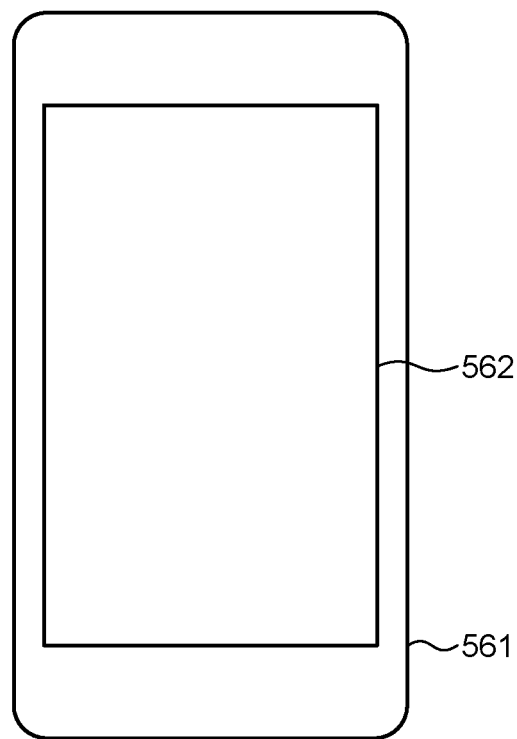
FIG. 38 is a diagram illustrating an example of an electronic apparatus to which the display device according to the embodiment or any of the modifications thereof is applied.

The electronic apparatus illustrated in FIG. 38 is a portable information terminal that operates as a portable computer, a multifunctional mobile phone, a portable computer with voice call capability, or a portable computer with communication capability, and that is sometimes called a smartphone or a tablet computer. This portable information terminal includes, for example, a display unit 562 on a surface of a housing 561. The display unit 562 corresponds to the display device 1 according to the present embodiment or the display device according to any of the modifications thereof.

3. Aspects of Present Disclosure

The present disclosure includes aspects as follows.
(1) A display device that displays an image, the display device comprising:
a display area in which a plurality of pixels are aligned in row and column directions, each of the pixels including a drive element;
a plurality of scan lines extending in the row direction, each of the scan lines being coupled with the drive elements included in the pixels aligned in the row direction to transmit thereto a scan signal for selecting the pixels in the display area row by row;
a plurality of signal lines extending in the column direction, each of the signal lines being coupled with the drive elements included in the pixels aligned in the column direction to write display data of the image to be displayed on the display area to the pixels in a row selected by the scan signal; and a display control unit configured to:
  alternately repeat a display period of writing the display data to the pixels and a stop period of stopping the writing of the display data to the pixels;
  in a former term of the stop period, set all of the signal lines to have a predetermined potential; and
  in a latter term of the stop period, provide the display data written in the respective pixels in a row that has been selected during the display period immediately before the stop period, to the signal lines corresponding to the respective pixels.

(2) The display device according to (1), wherein, in the latter term of the stop period, the display control unit does not provide the display data to a signal line corresponding to a pixel to which the display data is written first among the pixels arranged in a row to be selected in the display period following the stop period.

(3) The display device according to (1), wherein the display control unit is configured to:
  in the former term of the stop period, supply the signal lines with, among pieces of the display data that has been written in the respective pixels in the row that has been selected, a piece of the display data that has been written in a second pixel except a first pixel corresponding to a pixel to which the display data is written first among the pixels arranged in a row to be selected in the display period following the stop period; and
  in the latter term of the stop period, supply, among pieces of the display data that has been written in the respective pixels in the row that has been selected, each of pieces of the display data except pieces of the display data that have been written in the first and second pixels, to the signal line corresponding to the pixel in which the piece of the display data has been written.

(4) A display device that displays an image, the display device comprising:
a display area in which a plurality of pixels are aligned in row and column directions, each of the pixels including a drive element;
a plurality of scan lines extending in the row direction, each of the scan lines being coupled with the drive elements included in the pixels aligned in the row direction to transmit thereto a scan signal for selecting the pixels in the display area row by row;
a plurality of signal lines extending in the column direction, each of the signal lines being coupled with the drive elements included in the pixels aligned in the column direction to write display data of the image to be displayed on the display area to the pixels in a row selected by the scan signal;
switches provided between a transmission source of the display data and the signal lines; and
a display control unit configured to:
  alternately repeat a display period of writing the display data to the pixels and a stop period of stopping the writing of the display data to the pixels; and
  in the stop period, turn off all of the switches and set wiring from the transmission source to the switches to have any desirable potential.

(5) An electronic apparatus comprising the display device according to according to any one of (1) to (4).

The electronic apparatus of the present disclosure includes the above-described display device. Examples of the electronic apparatus of the present disclosure include, but are not limited to, a television device, a digital camera, a personal computer, a video camera, and a portable electronic apparatus such as a mobile phone.

The present disclosure can reduce streak defects and unevenness in an image displayed on a display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device that displays an image, the display device comprising:
  a display area in which a plurality of pixels are aligned in row and column directions, each of the pixels including a drive element;
  a plurality of scan lines extending in the row direction, each of the scan lines being coupled with the drive elements included in the pixels aligned in the row direction to transmit thereto a scan signal for selecting the pixels in the display area row by row;
  a plurality of signal lines extending in the column direction, each of the signal lines being coupled with the drive elements included in the pixels aligned in the column direction to write display data of the image to be displayed on the display area to the pixels in a row selected by the scan signal;
  a source driver that is a transmission source of the display data;
  a plurality of switches that are provided between the source driver and the signal lines, that are coupled with the source driver and the signal lines, and that are coupled with the respective drive elements via the respective signal lines; and
  a display control unit configured to:
    alternately repeat a display period of writing the display data to the pixels and a stop period of stopping the writing of the display data to the pixels; and
    in the stop period, turn off all the switches and turn off all the drive elements, wherein
  during the entirety of the stop period, the signal lines hold the display data of one horizontal scanning period in the display period immediately before the stop period.

2. The display device according to claim 1,
  wherein each of the pixels includes a plurality of sub-pixels, and
  wherein ends of one end the switches are coupled with one another and are supplied with the display data from the source driver, and ends of the other end of the switches are coupled with the respective sub-pixels via the respective signal lines.

3. The display device according to claim 1, after the stop period, the display control unit writes the display data of one horizontal scanning period in the display period immediately before the stop period to the corresponding signal lines.

4. An electronic apparatus comprising the display device according to claim 1.

* * * * *